(12) United States Patent
Alshina et al.

(10) Patent No.: US 10,356,418 B2
(45) Date of Patent: Jul. 16, 2019

(54) VIDEO ENCODING METHOD AND APPARATUS THEREFOR, AND VIDEO DECODING METHOD AND APPARATUS THEREFOR, IN WHICH EDGE TYPE OFFSET IS APPLIED

(71) Applicant: SAMSUNG ELECTRONICS CO., LTD., Suwon-si (KR)

(72) Inventors: Elena Alshina, Suwon-si (KR); Alexander Alshin, Suwon-si (KR); Ki-ho Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/524,329

(22) PCT Filed: Nov. 4, 2015

(86) PCT No.: PCT/KR2015/011803
§ 371 (c)(1),
(2) Date: May 4, 2017

(87) PCT Pub. No.: WO2016/072750
PCT Pub. Date: May 12, 2016

(65) Prior Publication Data
US 2017/0339411 A1 Nov. 23, 2017

Related U.S. Application Data

(60) Provisional application No. 62/074,924, filed on Nov. 4, 2014.

(51) Int. Cl.
*H04N 19/139* (2014.01)
*H04N 19/174* (2014.01)
(Continued)

(52) U.S. Cl.
CPC ......... *H04N 19/139* (2014.11); *H04N 19/107* (2014.11); *H04N 19/117* (2014.11);
(Continued)

(58) Field of Classification Search
CPC .. H04N 19/139; H04N 19/107; H04N 19/117; H04N 19/136; H04N 19/174; H04N 19/182; H04N 19/184; H04N 19/176
See application file for complete search history.

(56) References Cited

U.S. PATENT DOCUMENTS 8,982,962 B2    3/2015  Alshin et al.
9,253,482 B2 *  2/2016  Kim ...................... H04N 19/80
(Continued)

FOREIGN PATENT DOCUMENTS

KR   10-2011-0111852 A   10/2011
KR   10-2013-0070195 A    6/2013
WO       2013/107314 A1   7/2013

OTHER PUBLICATIONS

International Search Report and Written Opinion, issued by International Searching Authority in corresponding International Application No. PCT/KR2015/011803, dated Feb. 25, 2016, (PCT/ISA/210 & PCT/ISA/237).
(Continued)

*Primary Examiner* — Mohammad J Rahman
(74) *Attorney, Agent, or Firm* — Sughrue Mion, PLLC

(57) ABSTRACT

Provided is a video decoding method including: acquiring offset type information of a current block; determining a neighboring sample of a current reconstruction sample of the current block according to an edge direction when the offset type information of the current block indicates an edge type; determining an offset category of the current reconstruction sample based on a sample value gradient between a sample value of the current reconstruction sample and a sample
(Continued)

value of the neighboring sample and a difference in the sample value gradient; and applying, from among offsets acquired from a bitstream, an offset according to the determined offset category to the current reconstruction sample.

12 Claims, 30 Drawing Sheets

(51) Int. Cl.
  *H04N 19/184* (2014.01)
  *H04N 19/107* (2014.01)
  *H04N 19/176* (2014.01)
  *H04N 19/117* (2014.01)
  *H04N 19/136* (2014.01)
  *H04N 19/182* (2014.01)

(52) U.S. Cl.
  CPC ......... *H04N 19/136* (2014.11); *H04N 19/174* (2014.11); *H04N 19/182* (2014.11); *H04N 19/184* (2014.11); *H04N 19/176* (2014.11)

(56) References Cited

U.S. PATENT DOCUMENTS

| 2013/0022103 A1 | 1/2013 | Budagavi | |
| 2013/0177067 A1 | 7/2013 | Minoo et al. | |
| 2013/0279568 A1 | 10/2013 | Matsunobu et al. | |
| 2014/0036992 A1* | 2/2014 | Chao | H04N 19/176 375/240.02 |
| 2014/0247872 A1* | 9/2014 | Merkle | H04N 19/597 375/240.12 |
| 2014/0314141 A1 | 10/2014 | Choi et al. | |
| 2015/0215617 A1* | 7/2015 | Leontaris | H04N 19/82 375/240.03 |
| 2016/0014416 A1* | 1/2016 | Hinz | H04N 19/105 375/240.13 |
| 2016/0261863 A1* | 9/2016 | Chen | H04N 19/176 |
| 2016/0277771 A1* | 9/2016 | Nakagami | H04N 19/70 |

OTHER PUBLICATIONS

Communication dated Oct. 2, 2017, issued by the European Patent Office in counterpart European application No. 15856384.1.
Bross, et al., "High Efficiency video coding (HEVC) text specification draft 7", Joint Collaborative Team on Video Coding (JCT-VC) of ITU-T SG16 WP3 and ISO/IEC JTC1/SC29/WG11 9th Meeting: Geneva, CH, Apr. 27-May 7, 2012, Document: JCTVC-11003_d0, 268 pages total.
Sugio, et al., "AHG6: A threshold for SAO edge offset" Joint Collaborative Team on Video Coding (JCT-VC) of ITU-T SG16 WP3 and ISO/IEC JTC1/SC29/WG11 10th Meeting: Stockholm, SE, Jul. 11-20, 2012, Document: JCTVC-J0213 WG11 No. m25539, 8 pages total.

\* cited by examiner

| CATEGORY | CONDITION |
|---|---|
| 1 | $y'' \geq ThH$ |
| 2 | $ThH > y'' > ThL$ |
| 3 | $-ThL > y'' > -ThH$ |
| 4 | $y'' \leq -ThH$ |
| 0 | $-ThL \leq y'' \leq ThL$ |

| CATEGORY | CONDITION |
|---|---|
| 1 | $d^2 \geq ThHd$ & $y_2 - 2y_0 + y_1 > 0$ |
| 2 | $ThHd > d^2 > ThLd$ & $y_2 - 2y_0 + y_1 > 0$ |
| 3 | $ThHd > d^2 > ThLd$ & $y_2 - 2y_0 + y_1 < 0$ |
| 4 | $d^2 \geq ThHd$ & $y_2 - 2y_0 + y_1 < 0$ |
| 0 | $d^2 \leq ThLd$ |

| CATEGORY | CONDITION |
|---|---|
| 1 | $1/r^2 \geq ThHr$ & $M_y > y_0$ |
| 2 | $ThHr > 1/r^2 > ThLr$ & $M_y > y_0$ |
| 3 | $ThHr > 1/r^2 > ThLr$ & $M_y < y_0$ |
| 4 | $1/r^2 \geq ThHr$ & $M_y < y_0$ |
| 0 | $1/r^2 \leq ThLr$ |

| CATEGORY | CONDITION |
|---|---|
| 1 | $1/\cos^2(\alpha) \geq 1+ThH\alpha$ & $y_2 - 2y_0 + y_1 > 0$ |
| 2 | $1+ThH\alpha > 1/\cos^2(\alpha) > 1+ThL\alpha$<br>& $y_2 - 2y_0 + y_1 > 0$ |
| 3 | $1+ThH\alpha > 1/\cos^2(\alpha) > 1+ThL\alpha$<br>& $y_2 - 2y_0 + y_1 < 0$ |
| 4 | $1/\cos^2(\alpha) \geq 1+ThH\alpha$ & $y_2 - 2y_0 + y_1 < 0$ |
| 0 | $1/\cos^2(\alpha) \leq 1+ThL\alpha$ |

PARTITION TYPE INFORMATION (800)

PREDICTION MODE INFORMATION (810)

TRANSFORMATION UNIT SIZE INFORMATION (820)

CODING UNITS (1010)

VIDEO ENCODING METHOD AND APPARATUS THEREFOR, AND VIDEO DECODING METHOD AND APPARATUS THEREFOR, IN WHICH EDGE TYPE OFFSET IS APPLIED

TECHNICAL FIELD

The present disclosure relates to video encoding methods and apparatuses and video decoding methods and apparatuses applying an edge-type offset.

BACKGROUND ART

As hardware for reproducing and storing high resolution or high quality video content is being developed and supplied, a need for a video codec for effectively encoding or decoding the high resolution or high quality video content is increasing. In a conventional video codec, a video is encoded according to a limited encoding method based on coding units having a predetermined size.

Image data of a space domain is transformed into coefficients of a frequency domain via frequency transformation. In a video codec, an image is split into blocks having a predetermined size, discrete cosine transformation (DCT) is performed on each block, and frequency coefficients are encoded in block units, for rapid calculation of frequency transformation. Compared with image data of a space domain, coefficients of a frequency domain are easily compressed. In particular, since an image pixel value of a space domain is expressed according to a prediction error via inter prediction or intra prediction of a video codec, when frequency transformation is performed on the prediction error, a large amount of data may be transformed to 0. According to a video codec, an amount of data may be reduced by replacing data, which is consecutively and repeatedly generated, with small-sized data.

In particular, it may be possible to apply a method of adjusting a reconstruction sample value by an adaptively determined offset to a sample in order to minimize an error between an original image and a reconstruction image in a video encoding and decoding operation.

DETAILED DESCRIPTION OF THE INVENTION

Provided are video encoding methods and apparatuses and video decoding methods and apparatuses applying an edge-type offset in order to improve an image quality of a reconstruction image. In this case, by classifying reconstruction samples of a current block by using a sample value and then applying an offset according to a classified category to the reconstruction samples, it may be possible to remove a ringing artifact of various directions occurring in the reconstruction image and reduce an error in the reconstruction image.

Of course, the technical problems of the present disclosure are not limited thereto, and other technical problems will become apparent to one of ordinary skill in the art from the following description.

According to an embodiment, a video decoding method includes: acquiring offset type information of a current block; determining a neighboring sample of a current reconstruction sample of the current block according to an edge direction when the offset type information of the current block indicates an edge type; determining an offset category of the current reconstruction sample based on a sample value gradient between a sample value of the current reconstruction sample and a sample value of the neighboring sample and a difference in the sample value gradient; and applying, from among offsets acquired from a bitstream, an offset according to the determined offset category to the current reconstruction sample.

BEST MODE

Figure 1A:
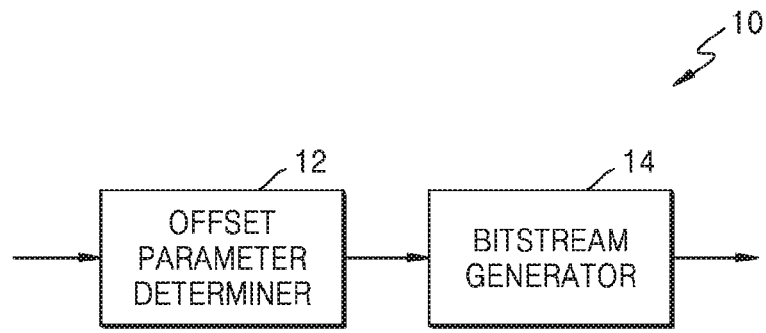
FIGS. 1A and 1B respectively illustrate a block diagram of a video encoding apparatus and a flow diagram of a video encoding method applying an edge-type offset, according to an embodiment.

According to an embodiment, a video decoding method includes: acquiring offset type information of a current block; determining a neighboring sample of a current reconstruction sample of the current block according to an edge direction when the offset type information of the current block indicates an edge type; determining an offset category of the current reconstruction sample based on a sample value gradient between a sample value of the current reconstruction sample and a sample value of the neighboring sample and a difference in the sample value gradient; and applying, from among offsets acquired from a bitstream, an offset according to the determined offset category to the current reconstruction sample.

Also, the determining of the offset category of the current reconstruction sample may include determining the offset category of the current reconstruction sample based on a difference between a sample value gradient between the current reconstruction sample and a first neighboring sample and a sample value gradient between the current reconstruction sample and a second neighboring sample, wherein the first neighboring sample and the second neighboring sample may be located on opposite sides of the current reconstruction sample.

Also, the determining of the offset category of the current reconstruction sample may include determining the offset category of the current reconstruction sample, based on a curvature of a sample value in the current reconstruction sample, wherein the curvature of the sample value is determined based on a sample value of the current reconstruction sample and a sample value of the neighboring sample.

Also, the determining of the offset category of the current reconstruction sample may include determining the offset category of the current reconstruction sample based on a radius of a circle passing through three points respectively according to a sample value of the current reconstruction sample, a sample value of a first neighboring sample, and a sample value of a second neighboring sample on a coordinate plane.

Also, the determining of the offset category of the current reconstruction sample may include determining the offset category of the current reconstruction sample based on an angle between a sample value gradient between the current reconstruction sample and a first neighboring sample and a sample value gradient between the current reconstruction sample and a second neighboring sample.

Also, the determining of the offset category of the current reconstruction sample may include determining the offset category of the current reconstruction sample based on a sign of the difference in the sample value gradient.

Also, the determining of the offset category of the current reconstruction sample may include determining the offset category of the current reconstruction sample by comparing the difference in the sample value gradient with a reference value.

Also, the reference value may be determined based on a slice type of a slice including the current reconstruction sample.

Also, the determining of the offset category of the current reconstruction sample may include determining the offset category of the current reconstruction sample as any one category among full valley, half valley, plain, half peak, and full peak.

Also, the determining of the offset category of the current reconstruction sample may include determining the offset category of the current reconstruction sample in consideration of a maximum value and a minimum value of a sample value gradient in the current reconstruction sample.

According to another embodiment, a video encoding method includes: determining a neighboring sample of a current reconstruction sample of a current block according to an edge direction of the current reconstruction sample of the current block; determining an offset category of the current reconstruction sample based on a sample value gradient between a sample value of the current reconstruction sample and a sample value of the neighboring sample and a difference in the sample value gradient; determining an offset according to the determined offset category of the current reconstruction sample; and encoding the offset determined according to the determined offset category of the current reconstruction sample.

Also, the determining of the offset category of the current reconstruction sample may include determining the offset category of the current reconstruction sample based on a difference between a sample value gradient between the current reconstruction sample and a first neighboring sample and a sample value gradient between the current reconstruction sample and a second neighboring sample, wherein the first neighboring sample and the second neighboring sample may be located on opposite sides of the current reconstruction sample.

Also, the determining of the offset category of the current reconstruction sample may include determining the offset category of the current reconstruction sample, based on a curvature of a sample value in the current reconstruction sample, wherein the curvature of the sample value is determined based on the sample value of the current reconstruction sample and a sample value of the neighboring sample.

Also, the determining of the offset category of the current reconstruction sample may include determining the offset category of the current reconstruction sample based on a radius of a circle passing through three points respectively according to a sample value of the current reconstruction sample, a sample value of a first neighboring sample, and a sample value of a second neighboring sample on a coordinate plane.

Also, the determining of the offset category of the current reconstruction sample may include determining the offset category of the current reconstruction sample based on an angle between a sample value gradient between the current reconstruction sample and a first neighboring sample and a sample value gradient between the current reconstruction sample and a second neighboring sample.

Also, the determining of the offset category of the current reconstruction sample may include determining the offset category of the current reconstruction sample based on a sign of the difference in the sample value gradient.

Also, the determining of the offset category of the current reconstruction sample may include determining the offset category of the current reconstruction sample by comparing the difference in the sample value gradient with a reference value.

Also, the reference value may be determined based on a slice type of a slice including the current reconstruction sample.

Also, the determining of the offset category of the current reconstruction sample may include determining the offset category of the current reconstruction sample as any one category among full valley, half valley, plain, half peak, and full peak.

Also, the determining of the offset category of the current reconstruction sample may include determining the offset category of the current reconstruction sample in consideration of a maximum value and a minimum value of a sample value gradient in the current reconstruction sample.

According to another embodiment, a video decoding apparatus includes: an offset parameter acquirer configured to acquire offset type information of a current block, acquire edge class information representing an edge direction when the offset type information of the current block indicates an edge type, and determine a neighboring sample of a current reconstruction sample of the current block according to the edge direction; and a sample compensator configured to determine an offset category of the current reconstruction sample based on a sample value gradient between a sample value of the current reconstruction sample and a sample value of the neighboring sample and a difference in the sample value gradient and apply, from among offsets acquired from a bitstream, an offset according to the determined offset category to the current reconstruction sample.

According to another embodiment, a video encoding apparatus includes: an offset parameter determiner configured to determine a neighboring sample of a current reconstruction sample of a current block according to an edge direction of the current reconstruction sample of the current block, determine an offset category of the current reconstruction sample based on a sample value gradient between a sample value of the current reconstruction sample and a sample value of the neighboring sample and a difference in the sample value gradient, and determine an offset according to the offset category of the current reconstruction sample; and a bitstream generator configured to generate a bitstream including the offset determined according to the offset category of the current reconstruction sample.

MODE OF THE INVENTION

Hereinafter, methods of implementing and using the inventive concept will be described in detail. As described herein, the terms "units" and "modules" may refer to units that perform at least one function or operation, and the units may be implemented as hardware or software or a combination of hardware and software.

In this specification, "an embodiment" or "embodiments" of the principle of the inventive concept may refer to particular characteristics, structures, or features described together with embodiments included in at least one embodiment of the principle of the inventive concept. Therefore, the term "embodiment" or "embodiments" used throughout this specification may not necessarily refer to the same embodiment.

First, a video encoding method and a video decoding method applying an edge-type offset according to an embodiment will be described with reference to FIGS. 1A to 10B. Provided are various embodiments of scalable video encoding methods and apparatuses performing encoding by applying an edge-type sample adaptive offset (SAO). Also, embodiments in which edge-type offset methods according to sample classification are used in video encoding methods and video decoding methods based on coding units of a tree structure according to various embodiments will be described with reference to FIGS. 11 to 30.

Hereinafter, an 'image' may denote a still image or a moving image of a video, or a video itself.

Hereinafter, a 'sample' may refer to a predetermined unit of a sampling position of an image. For example, samples may be pixels, half pixels, or other units of blocks in an image. Hereinafter, a 'sample value' may refer to data that is assigned to a sampling location of an image and is to be processed. For example, pixel values or residual of a block in an image of a spatial domain may be samples. Thus, those of ordinary skill in the art will understand that processes described hereinafter as being performed in units of 'pixels' are merely examples and all of them may also be performed in units of 'samples'.

Also, hereinafter, a 'current block' may denote a block of an image to be encoded or decoded.

First, a video encoding method and a video decoding method applying an edge-type offset will be described with reference to FIGS. 1A to 10B.

Figure 2A:
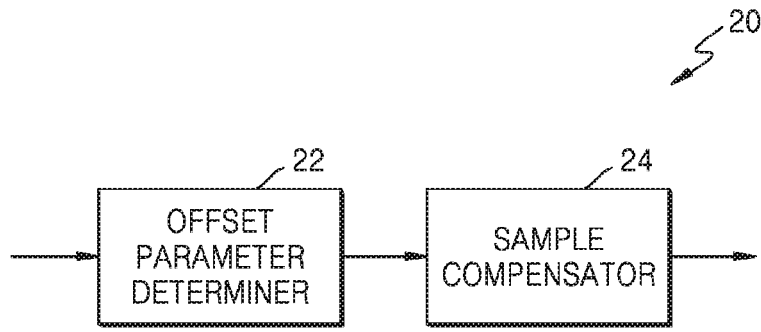
FIGS. 2A and 2B respectively illustrate a block diagram of a video decoding apparatus and a flow diagram of a video decoding method applying an edge-type offset, according to an embodiment.

Referring to FIGS. 1A and 2A, samples may be signaled between a video encoding apparatus 10 and a video decoding apparatus 20. That is, the video encoding apparatus 10 may encode and transmit video samples in a bitstream type, and the video decoding apparatus 20 may parse and reconstruct the samples from a received bitstream.

According to an embodiment, the video encoding apparatus 10 and the video decoding apparatus 20 may signal an offset parameter in order to minimize an error between an original sample and a reconstruction sample by applying an offset determined by sample classification to a reconstruction block. Between the video encoding apparatus 10 and the video decoding apparatus 20, an offset value may be encoded and transmitted as the offset parameter such that the offset value may be decoded from the received offset parameter.

Thus, according to an embodiment, the video decoding apparatus 20 may generate a reconstruction image having a minimized error with respect to an original image by decoding a received bitstream, generating reconstruction samples of each of image blocks, reconstructing an offset value from the bitstream, and adjusting the reconstruction samples by the offset value.

In this case, according to an embodiment, the video encoding apparatus 10 and the video decoding apparatus 20 may determine an edge-type offset category of the reconstruction samples in order to apply an edge-type offset.

Hereinafter, an operation of the video encoding apparatus 10 applying an edge-type offset will be described with reference to FIGS. 1A and 1B, and an operation of the video decoding apparatus 20 applying an edge-type offset will be described with reference to FIGS. 2A and 2B.

Figure 1B:
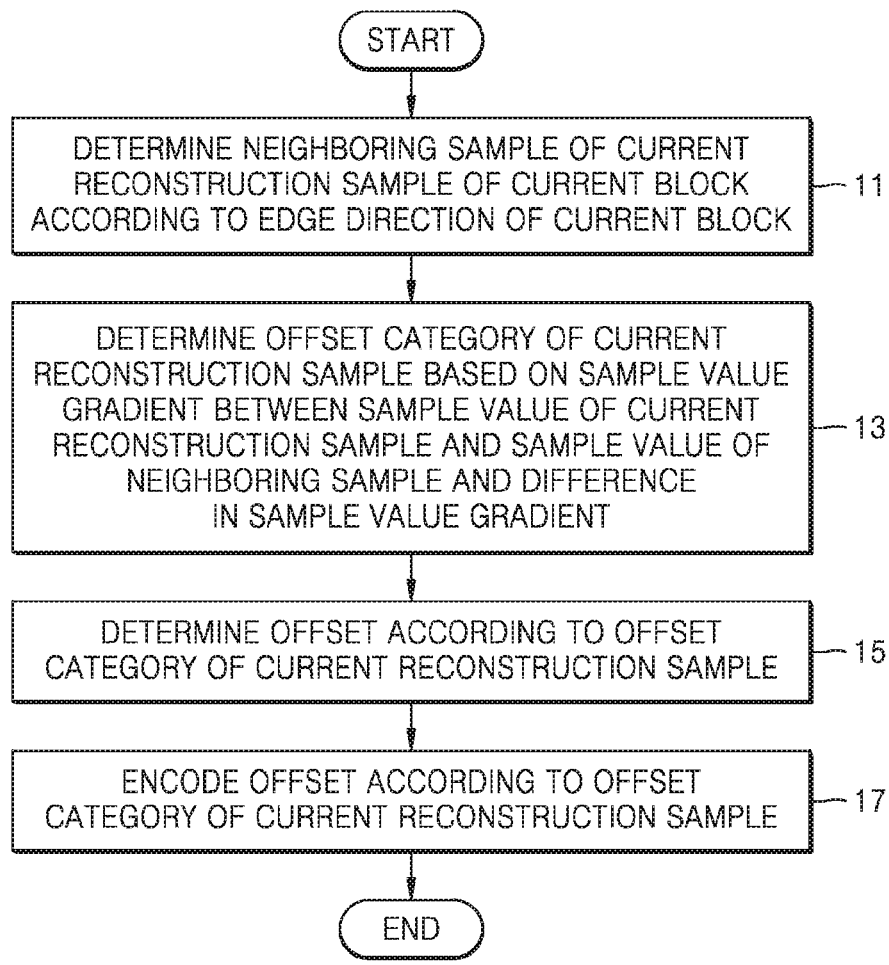

FIGS. 1A and 1B respectively illustrate a block diagram of a video encoding apparatus 10 and a flow diagram of a video encoding method applying an edge-type offset, according to an embodiment.

Referring to FIG. 1A, the video encoding apparatus 10 according to an embodiment may include an offset parameter determiner 12 and a bitstream generator 14.

According to an embodiment, the video encoding apparatus 10 may receive images of a video, split each image into blocks, and encode each block. A block may have a square shape, a rectangular shape, or any geometrical shape, and is not limited to a data unit having a predetermined size. According to an embodiment, the block may be a largest coding unit (LCU) or a coding unit (CU) among coding units according to a tree structure. A video encoding/decoding method based on the coding units according to a tree structure will be described below with reference to FIGS. 11 to 30.

According to an embodiment, the video encoding apparatus 10 may split each input image into blocks such as LCUs, and may output resultant data generated by performing prediction, transformation, and entropy encoding on samples of each block in the form of a bitstream. Sample values of samples of a block may be pixel value data of pixels included in the block.

According to an embodiment, the video encoding apparatus 10 may separately encode each of the blocks of an image. For example, the video encoding apparatus 10 encode a current LCU based on the coding units of a tree structure that are split from the current LCU.

According to an embodiment, in order to encode the current LCU, the video encoding apparatus 10 may encode samples by performing intra prediction, inter prediction, transformation, and quantization on each of the coding units of a tree structure that are included in the current coding unit.

Next, according to an embodiment, the video encoding apparatus 10 may reconstruct the samples included in the current LCU by performing inverse quantization (or dequantization), inverse transformation, intra prediction, or motion compensation on the encoded samples of each of the coding units of a tree structure to decode the coding units.

Also, according to an embodiment, the video encoding apparatus 10 may deblock a sample of the reconstructed current block to reduce the image quality degradation at a block boundary and may apply an offset to the deblocked current block to minimize an error between the original sample and the reconstruction sample.

In this case, according to an embodiment, the video encoding apparatus 10 may apply an edge-type offset to minimize an error in various directions between the original sample and the reconstruction sample to reduce an error in the reconstruction image. Also, according to an embodiment, the video encoding apparatus 10 may more accurately compensate an error in the reconstruction sample by determining an offset category of the reconstruction sample based on a sample value gradient between a sample value of the reconstruction sample and a sample value of the neighboring sample and a difference in the sample value gradient in the reconstruction sample.

For example, according to an embodiment, when an edge in the reconstruction sample is strong according to a sample value gradient between sample values of the neighboring samples and a sample value of the reconstruction sample of the current block, the video encoding apparatus 10 may determine an offset category of the reconstruction sample to apply a large offset. According to an embodiment, when an edge in the reconstruction sample is weak or absent according to a sample value gradient between sample values of the neighboring samples and a sample value of the reconstruction sample of the current block, the video encoding apparatus 10 may determine an offset category of the reconstruction sample to apply a small offset or no offset.

Specifically, according to an embodiment, the offset parameter determiner 12 may determine a neighboring sample of a current reconstruction sample of a current block according to an edge direction of the current block. For example, the current block may be an LCU of a video.

An offset type of the current block may include an edge type (EO), a band type (BO), or the like, and when the offset type of the current block is the edge type, an offset class representing the edge direction may be determined according to a sample value classification method.

For example, according to an embodiment, an edge-type offset class may represent an edge direction of 0°, 90°, 45°, or 135°. Also, in the case of the band type, instead of edge-type class information, information representing the position of a band that is an interval to which the sample values of the reconstruction sample belong may be encoded.

According to an embodiment, the offset parameter determiner 12 may determine a first neighboring sample and a second neighboring sample located on opposite sides of the current reconstruction sample among the neighboring samples adjacent to the current reconstruction sample of the current block, according to the edge direction of the current block. When the offset class is 0°, the first neighboring sample may be a sample adjacent to the left side of the current reconstruction sample in the current block and the second neighboring sample may be a sample adjacent to the right side of the current reconstruction sample in the current block. Various other examples of the neighboring samples will be described below with reference to FIG. 4.

According to an embodiment, the offset parameter determiner 12 may determine an offset category of the current reconstruction sample by using a sample value of the current reconstruction sample and a sample value of the previously determined neighboring samples. For example, the offset parameter determiner 12 may acquire a sample value gradient between a sample value of the current reconstruction sample and a sample value of the neighboring sample and may determine an offset category of the current reconstruction sample based on a difference in the sample value gradient.

Specifically, according to an embodiment, the offset parameter determiner 12 may acquire a first sample value gradient between the current reconstruction sample and the first neighboring sample and a second sample value gradient between the current reconstruction sample and the second neighboring sample. According to an embodiment, based on a difference between the first sample value gradient and the second sample value gradient, the offset parameter determiner 12 may determine the curvature and the shape of an edge in the current reconstruction sample and may determine the offset category of the current reconstruction sample.

For example, according to an embodiment, the offset parameter determiner 12 may determine the offset category of the current reconstruction sample as any one category among full valley, half valley, plain, half peak, and full peak based on the difference between the first sample value gradient and the second sample value gradient. The offset category will be described below in more detail with reference to FIG. 5.

According to an embodiment, the offset parameter determiner 12 may determine an offset according to the determined offset category of the current reconstruction sample. Also, the offset parameter determiner 12 may determine each offset category about all reconstruction samples in the current block and may determine offsets about each offset category.

For example, according to an embodiment, when the offset category includes the full valley, the half valley, the plain, the half peak, and the full peak, the offset parameter determiner 12 may determine a plurality of offsets according to each category. According to an embodiment, when the offset category is the plain, since an offset may not be applied to the current reconstruction sample, the offset parameter determiner 12 may determine four offsets according to each category except the plain.

According to an embodiment, the offset parameter determiner 12 may determine an offset parameter of the current block including offsets. For example, the offset parameter may include offset use information, offset type information, offset class information, and offsets of the current block. Also, the offset parameter may further include offset merge information indicating whether to acquire the offset parameter of the current block based on an offset parameter of a neighboring block of the current block. According to an embodiment, the neighboring block may be a left block or an upper block that is adjacent to the current block.

According to an embodiment, the offset parameter determiner 12 may determine the most suitable offset parameter in consideration of coding efficiency and rate-distortion (RD) cost.

That is, according to an embodiment, the offset parameter determiner 12 may determine the offset class information indicating the edge direction of an edge offset based on the determined offset category of the current block and the offsets of each category. Also, according to an embodiment, the offset parameter determiner 12 may determine the offset type information of the current block indicating whether the offset type is the edge type or the band type based on the spatial characteristics of the sample values of the current block among the edge type and the band type.

Also, according to an embodiment, the offset parameter determiner 12 may determine the offset use information indicating whether to apply an offset to the current block based on the determined offset type. Alternatively, according to an embodiment, the offset parameter determiner 12 may not determine the offset parameter of the current block when it is determined that an offset is not applied to a slice including the current block.

According to an embodiment, the offset parameter determiner 12 may determine an offset parameter for each color component of the current block. For example, with respect to a YCrCb color image, an offset parameter may be determined for each of a luma sample (a Y component) and first and second chroma samples (Cr and Cb components).

According to an embodiment, the bitstream generator 14 may generate a bitstream including the offset determined according to the determined offset category of the current reconstruction sample. The bitstream generator 14 may generate a bitstream including an offset by performing entropy encoding on an offset.

According to an embodiment, the bitstream generator 14 may perform entropy encoding on the offsets according to each offset category. Also, the bitstream generator 14 may generate a bitstream including an offset parameter by performing entropy encoding also on the offset parameters other than an offset.

The offset parameters according to an embodiment may be classified into a parameter that is entropy-encoded based on a context and a parameter that is entropy-encoded according to a bypass mode, according to entropy methods.

According to an embodiment, a context-based entropy encoding method may be performed by a series of operations including a binarization operation of converting a symbol such as an offset parameter of the current block into a bit string and an arithmetic coding operation of performing context-based arithmetic coding on a bit sequence. Context adaptive binary arithmetic coding (CABAC) or the like is widely used as an arithmetic coding method that performs context-based arithmetic coding. According to context-based arithmetic encoding/decoding, each bit of a symbol bit string may be each bin, and each bit position may be mapped to a bin index. A length of a bit string, that is, a length of bins, may vary according to a symbol value. Probability modeling based on a context of a symbol is necessary for context-based arithmetic encoding/decoding.

Context-based probability modeling is necessary under the assumption that a coding bit of the current symbol is probabilistically predicted based on the previously encoded symbols. For context-based probability modeling, a context needs to be newly updated for each bit position of a symbol bit string, that is, for each bin index. Herein, probability modeling is a process of analyzing the probability that each bin will be 0 or 1. A process of updating a context by reflecting a result obtained by analyzing a probability of each of symbols of a new block according to bits on a current context may be repeatedly performed in units of blocks. A probability model in which an occurrence probability is matched to each bin may be determined according as the probability modeling is repeated.

Thus, with reference to a context-based probability model, with respect to each bit of a binary bit string of current symbols, by performing an operation of selecting and outputting a code corresponding to a current context, context-based entropy encoding may be performed.

A process of determining a context-based probability model with respect to each bin of a symbol for context-based entropy encoding according to an embodiment may require a lot of operation amount and operation time. Meanwhile, an entropy encoding operation according to a bypass mode may refer to an entropy encoding operation using a probability model that does not consider a context of a symbol.

According to an embodiment, the bitstream generator 14 may generate a bitstream including entropy-encoded information and transmit the same to the video decoding apparatus 20 of FIG. 2A.

Referring to FIG. 1B, in operation 11, according to an embodiment, the video encoding apparatus 10 may determine a neighboring sample of a current reconstruction sample of a current block according to an edge direction of the current block.

For example, according to an embodiment, the video encoding apparatus 10 may determine a position of a neighboring sample of the current reconstruction sample according to an offset class of the current block. According to an embodiment, an edge-type offset class may represent a one-dimensional edge direction formed by two adjacent samples adjacent to the current reconstruction sample. For example, according to an embodiment, an edge class may represent an edge direction of 0°, 90°, 45°, or 135°.

According to an embodiment, the video encoding apparatus 10 may determine a first neighboring sample and a second neighboring sample located on opposite sides of the current reconstruction sample among the neighboring samples adjacent to the current reconstruction sample, according to an edge direction represented by an edge class of the current block.

For example, according to an embodiment, when the edge class represents an edge direction of 0°, the video encoding apparatus 10 may determine a sample adjacent to the left side of the current reconstruction sample as the first neighboring sample and a sample adjacent to the right side of the current reconstruction sample as the second neighboring sample. Various other examples of the neighboring samples will be described below with reference to FIG. 4.

In operation 13, according to an embodiment, the video encoding apparatus 10 may determine an offset category of the current reconstruction sample based on a sample value gradient between a sample value of the current reconstruction sample and a sample value of the determined neighboring sample and a difference in the sample value gradient.

According to an embodiment, a sample value gradient between sample values may be acquired by a difference between the sample values and may be information including both a change direction (sign) and a change amount of the sample values. Also, a sample value gradient between sample values may be understood as a slope of a line segment connecting coordinates representing the sample values on a two-dimensional coordinate plane having an X axis and a Y axis respectively representing sample indexes and sample values. In this case, the sample indexes may represent the order of samples and may be indexed according to the edge direction, for example.

According to an embodiment, the video encoding apparatus 10 may acquire a first sample value gradient between the sample value of the current reconstruction sample and the sample value of the first neighboring sample by subtracting the sample value of the first neighboring sample from the sample value of the current reconstruction sample. The first neighboring sample may be a sample reconstructed before the current reconstruction sample. Also, according to an embodiment, the video encoding apparatus 10 may acquire a second sample value gradient between the sample value of the current reconstruction sample and the sample value of the second neighboring sample by subtracting the sample value of the current reconstruction sample from the sample value of the second neighboring sample. The second neighboring sample may be a sample reconstructed after the current reconstruction sample.

In this case, the sample value of the first neighboring sample, the sample value of the second neighboring sample, and the sample value of the current reconstruction sample may all be reconstructed sample values.

According to an embodiment, a difference in the sample value gradient may be acquired by a sample value gradient difference between the sample values and may be information including both the direction (sign) and the amount of the difference. Also, according to an embodiment, a sample value gradient difference in the current reconstruction sample may be understood as a change amount of a slope at a coordinate point representing the sample value of the current reconstruction sample on a two-dimensional coordinate plane having an X axis and a Y axis respectively representing X coordinates of samples and sample values. That is, the sample value gradient difference in the current reconstruction sample may represent the edge shape and strength indicating whether an edge according to the sample value is present or absent or whether it is strong or weak.

For example, according to an embodiment, the video encoding apparatus 10 may determine the sample value gradient difference in the current reconstruction sample by subtracting the first sample value gradient from the second sample value gradient.

In this case, according to an embodiment, the video encoding apparatus 10 may determine the sample value gradient difference in the current reconstruction sample in consideration of a maximum value and a minimum value of the sample value gradient. According to an embodiment, when the sample value gradient between the sample values is excessively large or small, since an excessive buffer space may be required in a calculation process and an operation thereof may be unnecessarily complicated, the maximum value and the minimum value of the sample value gradient may be necessary for convenience of implementation and improvement of performance.

Various other examples of the sample value gradient difference in the current reconstruction sample will be described below with reference to FIGS. 6A to 10B.

Meanwhile, according to an embodiment, the video encoding apparatus 10 may determine an offset category of the current reconstruction sample based on the determined sample value gradient difference.

Specifically, according to an embodiment, the video encoding apparatus 10 may determine an offset category of the current reconstruction sample by comparing the determined sample value gradient difference with a reference value.

The reference value may include a first reference value and a second reference value. According to an embodiment, the first reference value may be a reference value for discriminating between the full valley and the half valley or between the full peak and the half peak, and for example, it may be used to adjust the ratio between a reconstruction sample belonging to a full valley category and a reconstruction sample belonging to a half valley category and to adjust the ratio between a reconstruction sample belonging to a full peak category and a reconstruction sample belonging to a half peak category. According to an embodiment, the second reference value may be a reference value for discriminating whether the offset category of a reconstruction sample is plain or not, and for example, it may be used to adjust the ratio between a reconstruction sample to which an offset is not applied and a reconstruction sample to which an offset is applied. When an error in the reconstruction image is expected to be large, the ratio of a reconstruction sample belonging to a plain category may be reduced by setting the second reference value to be small.

That is, the number of samples to which an offset according to each category is to be applied may be adjusted by using the reference value according to an embodiment. Various examples of the reference value will be described below with reference to FIGS. 7A to 7E.

Specifically, according to an embodiment, the video encoding apparatus 10 may determine the offset category of the current reconstruction sample as the full valley when the sample value gradient difference is greater than or equal to the first reference value. Also, according to an embodiment, the video encoding apparatus 10 may determine the offset category of the current reconstruction sample as the half valley when the sample value gradient difference is smaller than the first reference value and is greater than the second reference value and may determine the offset category of the current reconstruction sample as the plain when the sample value gradient difference is smaller than or equal to the second reference value and is greater than or equal to a negative value of the second reference value.

Also, according to an embodiment, the video encoding apparatus 10 may determine an offset category of the current reconstruction sample by further considering a sign of the sample value gradient difference. For example, according to an embodiment, the video encoding apparatus 10 may determine the offset category of the current reconstruction sample as the full peak when the sample value gradient difference is smaller than or equal to a negative value of the first reference value and may determine the offset category of the current reconstruction sample as the half peak when the sample value gradient difference is greater than a negative value of the first reference value and is smaller than a negative value of the second reference value.

According to an embodiment, the reference value and the maximum value and the minimum value of the sample value gradient may be equally preset in the video encoding apparatus 10 and the video decoding apparatus 20. Alternatively, according to an embodiment, the reference value and the maximum value and the minimum value of the sample value gradient may be determined based on a slice type of a slice including the current reconstruction sample. Alternatively, according to an embodiment, the reference value and the maximum value and the minimum value of the sample value gradient may be determined according to a quantization parameter (QP) of the current block.

Alternatively, according to an embodiment, the reference value and the maximum value and the minimum value of the sample value gradient may be transmitted as a syntax element in a bitstream. For example, the reference value may be included in a slice header, a sequence parameter set (SPS), or a picture parameter set (PPS).

A more detailed process of determining the offset category of the current reconstruction sample by comparing the sample value gradient difference with the reference value will be described below with reference to FIGS. 5 to 10B.

In operation 15, according to an embodiment, the video encoding apparatus 10 may determine an offset according to the determined offset category of the current reconstruction sample.

For example, according to an embodiment, in order to reduce an error in the reconstruction sample, the video encoding apparatus 10 may determine offsets such that an absolute value of the offset in the case where the offset class is the full valley is greater than an absolute value of the offset in the case where the offset class is the half valley. Also, according to an embodiment, the video encoding apparatus 10 may determine an offset as a positive value in the case where the offset class is the full valley and in the case where the offset class is the half valley.

Also, according to an embodiment, the video encoding apparatus 10 may determine offsets such that an absolute value of the offset in the case where the offset class is the full peak is greater than an absolute value of the offset in the case where the offset class is the half peak. Also, according to an embodiment, the video encoding apparatus 10 may determine an offset as a negative value in the case where the offset class is the full peak and in the case where the offset class is the half peak.

According to an embodiment, the video encoding apparatus 10 may determine an offset as 0 in the case where the offset class is the plain. Alternatively, according to an embodiment, the video encoding apparatus 10 may not determine an offset in the case where the offset class is the plain.

In operation 17, according to an embodiment, the video encoding apparatus 10 may encode the offset according to the offset category of the current reconstruction sample. Offsets encoded according to the offset category may be included in a bitstream and transmitted to the video decoding apparatus 20.

According to an embodiment, in addition to the offsets, the video encoding apparatus 10 may encode and transmit offset parameters for offset application.

According to an embodiment, the video encoding apparatus 10 may include a central processor (not illustrated) for collectively controlling the offset parameter determiner 12 and the bitstream generator 14. Alternatively, the offset parameter determiner 12 and the bitstream generator 14 may be operated by their respective processors (not illustrated), and the video encoding apparatus 10 may be operated as a whole according as the processors (not illustrated) operate organically. Alternatively, according to an embodiment, the offset parameter determiner 12 and the bitstream generator 14 may be controlled under the control of an external processor (not illustrated) of the video encoding apparatus 10.

According to an embodiment, the video encoding apparatus 10 may include a data storage unit (not illustrated) for storing input/output data of the offset parameter determiner 12 and the bitstream generator 14. The video encoding apparatus 10 may include a memory controller (not shown) that manages data input and output of the data storage unit (not shown).

In order to output a video encoding result, the video encoding apparatus 10 may operate in cooperation with an internal video encoding processor installed therein or an external video encoding processor so as to perform video encoding operations including transformation. The internal video encoding processor of the video encoding apparatus 10 may perform the video encoding operations as a separate processor. Also, basic video encoding operations may be realized as the video encoding apparatus 10, a central processing apparatus, or a graphic processing apparatus includes a video encoding processing module.

Figure 2B:
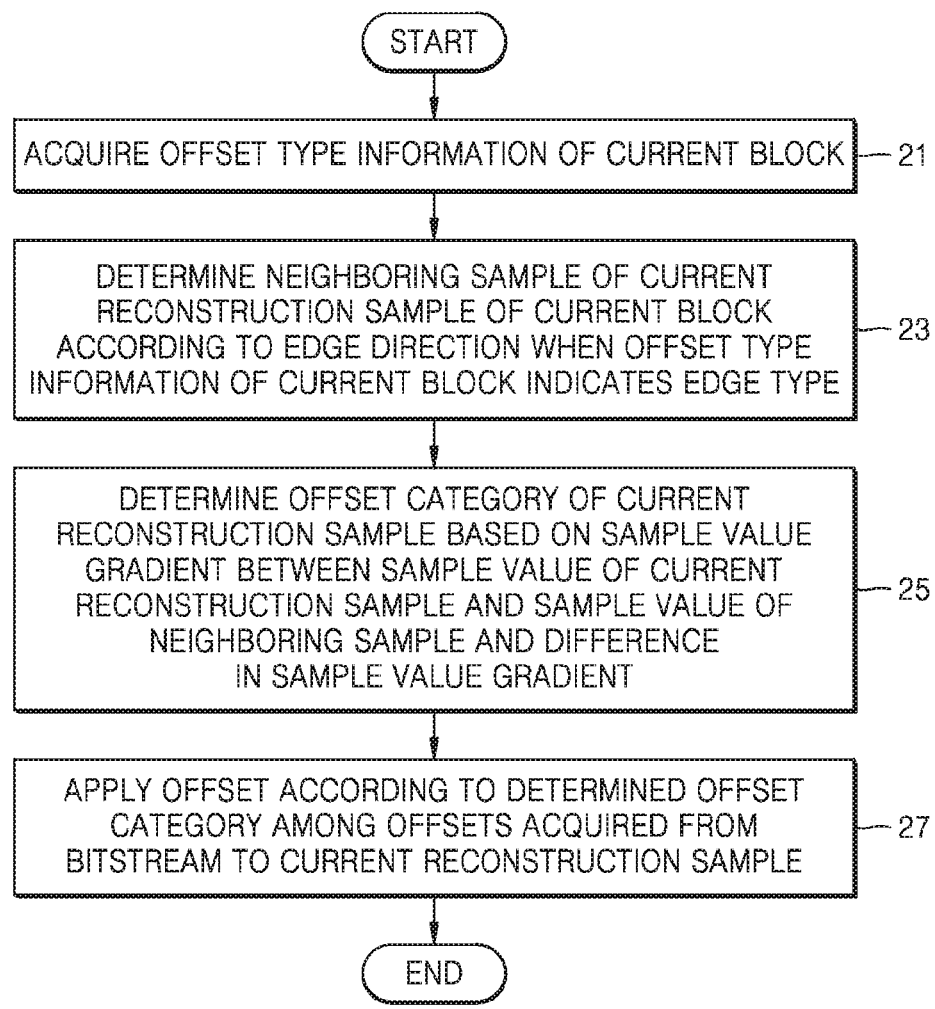

FIGS. 2A and 2B respectively illustrate a block diagram of a video decoding apparatus 20 and a flow diagram of a video decoding method applying an edge-type offset, according to an embodiment.

Referring to FIG. 1A, the video decoding apparatus 20 according to an embodiment may include an offset parameter acquirer 22 and a sample compensator 24.

According to an embodiment, the video decoding apparatus 20 may receive a bitstream including encoded data of a video. The video decoding apparatus 20 may parse encoded video samples from the received bitstream, generate reconstruction samples by performing entropy decoding, inverse quantization, inverse transformation, prediction, and motion compensation on each image block, and generate a reconstruction image consequently.

Also, according to an embodiment, the video decoding apparatus 20 may minimize an error between an original image and a reconstruction image by receiving offset parameters for adjusting a difference value between an original sample and a reconstruction sample. The video decoding apparatus 20 may receive and reconstruct encoded data of a current block of a video. For example, the video decoding apparatus 20 may receive encoded data for each largest coding unit and may reconstruct each largest coding unit based on coding units of a tree structure that is split from each largest coding unit.

Specifically, according to an embodiment, the video decoding apparatus 20 may parse information indicating whether to apply an offset to a current slice from a slice header of the received bitstream. According to an embodiment, the video decoding apparatus 20 may parse offset use information about the current slice with respect to each color component of the current slice.

Also, according to an embodiment, the video decoding apparatus 20 may parse an offset parameter of the current block from the slice header of the received bitstream according to whether an offset is applied to the current slice including the current block. According to an embodiment, the video decoding apparatus 20 may parse an offset parameter of the current block with respect to each color component of the current block. For example, with respect to a YCrCb color image, an offset parameter of the current block may be parsed for each of a luma sample (a Y component) and first and second chroma samples (Cr and Cb components).

According to an embodiment, the offset parameter of the current block may include offset use information, offset type information, offset class information, and offsets of the current block. Also, the offset parameter may further include offset merge information indicating whether to acquire the offset parameter of the current block based on an offset parameter of a neighboring block of the current block.

Also, according to an embodiment, the video decoding apparatus 20 may parse the offset merge information about the current block and may not parse the offset parameter of the current block when the offset merge information indicates that the offset parameter of the neighboring block is available.

According to an embodiment, the offset parameter acquirer 22 may acquire the offset type information of the current block. For example, according to an embodiment, the offset parameter acquirer 22 may acquire 1-bit offset type information indicating whether an offset type of the current block is an edge type or a band type.

Also, according to an embodiment, when the offset type information of the current block indicates an edge type, the offset parameter acquirer 22 may acquire edge class information representing an edge direction.

For example, according to an embodiment, edge-type offset class information may represent an edge direction of 0°, 90°, 45°, or 135°. Also, in the case of the band type, instead of edge-type class information, information representing the position of a band that is an interval to which the sample values of the reconstruction sample belong may be acquired.

According to an embodiment, the sample compensator 24 may minimize an error between the reconstruction image and the original image of the current block by using the offset parameters of the current block acquired by the offset parameter acquirer 22.

Specifically, according to an embodiment, based on the offset class information acquired from the bitstream, the sample compensator 24 may determine a neighboring sample of a current reconstruction sample of the current block according to an edge direction of the current block.

According to an embodiment, the sample compensator 24 may determine a first neighboring sample and a second neighboring sample located on opposite sides of the current reconstruction sample among the neighboring samples adjacent to the current reconstruction sample of the current block, according to the edge direction of the current block. When the offset class is 0°, the first neighboring sample may be a sample adjacent to the left side of the current reconstruction sample in the current block and the second neighboring sample may be a sample adjacent to the right side of the current reconstruction sample in the current block. Various other examples of the neighboring samples will be described below with reference to FIG. 4.

Also, according to an embodiment, the sample compensator 24 may determine an offset category of the current reconstruction sample based on a sample value gradient between a sample value of the current reconstruction sample and a sample value of the neighboring sample and a difference in the sample value gradient.

For example, according to an embodiment, the sample compensator 24 may acquire a sample value gradient between a sample value of the current reconstruction sample and a sample value of the neighboring samples and may determine an offset category of the current reconstruction sample based on a difference in the sample value gradient.

Specifically, according to an embodiment, the sample compensator 24 may acquire a first sample value gradient between the current reconstruction sample and the first neighboring sample and a second sample value gradient between the current reconstruction sample and the second neighboring sample. According to an embodiment, based on a difference between the first sample value gradient and the second sample value gradient, the sample compensator 24 may determine the strength and the shape of an edge in the current reconstruction sample and may determine the offset category of the current reconstruction sample.

For example, according to an embodiment, the sample compensator 24 may determine the offset category of the current reconstruction sample as any one category among full valley, half valley, plain, half peak, and full peak based on the difference between the first sample value gradient and the second sample value gradient. The offset category will be described below in more detail with reference to FIG. 5.

According to an embodiment, the sample compensator 24 may reduce an error in the reconstruction sample by applying an offset to the current reconstruction sample based on the determined offset category of the current reconstruction sample.

Specifically, according to an embodiment, the sample compensator 24 may apply an offset according to the determined offset category, among the offsets acquired from the bitstream by the offset parameter acquirer 22, to the current reconstruction sample. For example, according to an embodiment, the sample compensator 24 may apply a first offset to the current reconstruction sample when the offset category is the full valley, may apply a second offset to the current reconstruction sample when the offset category is the half valley, may apply a third offset to the current reconstruction sample when the offset category is the half peak, and may apply a fourth offset to the current reconstruction sample when the offset category is the full peak. Also, according to an embodiment, the sample compensator 24 may not apply an offset to the current reconstruction sample when the offset category is the plain.

Referring to FIG. 2B, in operation 21, according to an embodiment, the video decoding apparatus 20 may acquire offset type information of a current block.

For example, according to an embodiment, the video decoding apparatus 20 may acquire the offset type information of the current block from a bitstream and may determine whether an offset type of the current block is an edge type or a band type.

In operation 23, according to an embodiment, when the offset type information of the current block indicates an edge type, the video decoding apparatus 20 may determine a neighboring sample of a current reconstruction sample of the current block according to an edge direction.

For example, according to an embodiment, when the offset type information of the current block indicates an edge type, the video decoding apparatus 20 may acquire offset class information representing an edge direction of the current block. According to an embodiment, the video decoding apparatus 20 may determine a position of the neighboring sample of the current reconstruction sample of the current block according to an edge direction indicated by the acquired offset class information of the current block.

According to an embodiment, the video decoding apparatus 20 may determine a first neighboring sample and a second neighboring sample located on opposite sides of the current reconstruction sample among the neighboring samples adjacent to the current reconstruction sample of the current block, according to the edge direction. For example, according to an embodiment, when the edge class represents an edge direction of 0°, the video encoding apparatus 10 may determine a sample adjacent to the left side of the current reconstruction sample as the first neighboring sample and a sample adjacent to the right side of the current reconstruction sample as the second neighboring sample.

In operation 25, according to an embodiment, the video decoding apparatus 20 may determine an offset category of the current reconstruction sample based on a sample value gradient between a sample value of the current reconstruction sample and a sample value of the neighboring sample and a difference in the sample value gradient.

According to an embodiment, the video decoding apparatus 20 may determine an offset category of the current reconstruction sample based on a sample value gradient between a sample value of the current reconstruction sample and a sample value of the determined neighboring sample and a difference in the sample value gradient.

For example, according to an embodiment, the video decoding apparatus 20 may acquire a first sample value gradient between the sample value of the current reconstruction sample and the sample value of the first neighboring sample by subtracting the sample value of the first neighboring sample from the sample value of the current reconstruction sample. The first neighboring sample may be a sample reconstructed before the current reconstruction sample. Also, according to an embodiment, the video decoding apparatus 20 may acquire a second sample value gradient between the sample value of the current reconstruction sample and the sample value of the second neighboring sample by subtracting the sample value of the current reconstruction sample from the sample value of the second neighboring sample. The second neighboring sample may be a sample reconstructed after the current reconstruction sample.

In this case, the sample value of the first neighboring sample, the sample value of the second neighboring sample, and the sample value of the current reconstruction sample may all be reconstructed sample values.

Also, according to an embodiment, the video decoding apparatus 20 may determine the sample value gradient difference in the current reconstruction sample by subtracting the first sample value gradient from the second sample value gradient.

In this case, according to an embodiment, the video decoding apparatus 20 may determine the sample value gradient difference in the current reconstruction sample in consideration of a maximum value and a minimum value of the sample value gradient. According to an embodiment, when the sample value gradient between the sample values is excessively large or small, since an excessive buffer space may be required in a calculation process and an operation thereof may be unnecessarily complicated, the maximum value and the minimum value of the sample value gradient may be necessary for convenience of implementation and improvement of performance.

According to an embodiment, the video decoding apparatus 20 may determine an offset category of the current reconstruction sample by comparing the determined sample value gradient difference with a reference value.

Specifically, according to an embodiment, the video decoding apparatus 20 may determine the offset category of the current reconstruction sample as the full valley when the determined sample value gradient difference is greater than the first reference value. Also, according to an embodiment, the video decoding apparatus 20 may determine the offset category of the current reconstruction sample as the half valley when the sample value gradient difference is smaller than the first reference value and is greater than the second reference value and may determine the offset category of the current reconstruction sample as the plain when the sample value gradient difference is smaller than the second reference value.

Also, according to an embodiment, the video decoding apparatus 20 may determine an offset category of the current reconstruction sample by further considering a sign of the sample value gradient difference. For example, according to an embodiment, the video decoding apparatus 20 may determine the offset category of the current reconstruction sample as the full peak when the sample value gradient difference is smaller than a negative value of the first reference value and may determine the offset category of the current reconstruction sample as the half peak when the sample value gradient difference is greater than a negative value of the first reference value and is smaller than a negative value of the second reference value.

In operation 27, according to an embodiment, the video decoding apparatus 20 may apply an offset according to the determined offset category of the current block, among the offsets acquired from the bitstream, to the current reconstruction sample.

According to an embodiment, the video decoding apparatus 20 may apply a first offset to the current reconstruction sample when the determined offset category is the full valley, may apply a second offset to the current reconstruction sample when the offset category is the half valley, may apply a third offset to the current reconstruction sample when the offset category is the half peak, and may apply a fourth offset to the current reconstruction sample when the offset category is the full peak. Also, according to an embodiment, the video decoding apparatus 20 may not apply an offset to the current reconstruction sample when the determined offset category is the plain.

According to an embodiment, the video decoding apparatus 20 may more accurately reduce an error in the reconstruction image based on the sample value gradient difference between the samples.

Figure 3:
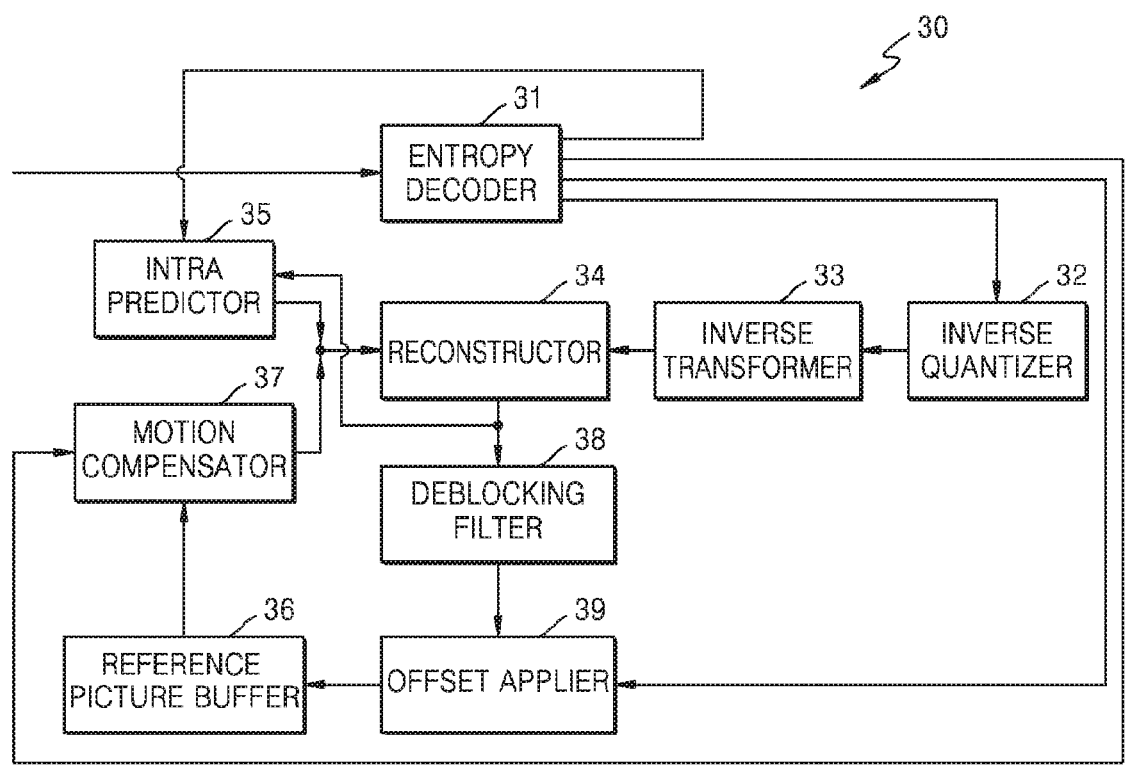
FIG. 3 illustrates a block diagram of a video decoding apparatus according to another embodiment.

Hereinafter, a video decoding method applying an edge offset will be described with reference to FIG. 3. FIG. 3 illustrates a block diagram of a video decoding apparatus 30 according to another embodiment.

The video decoding apparatus 30 may include an entropy decoder 31, an inverse quantizer 32, an inverse transformer 33, a reconstructor 34, an intra predictor 35, a reference picture buffer 36, a motion compensator 37, a deblocking filter 38, and an offset applier 39.

The video decoding apparatus 30 may receive a bitstream including encoded video data. The entropy decoder 31 may parse intra mode information, inter mode information, offset information, and residue data (residues) from the bitstream.

According to an embodiment, the offset information may include, for example, an offset parameter.

The residue data extracted by the entropy decoder 31 may be quantized transformation coefficients. Thus, the inverse quantizer 32 may perform inverse quantization on the residue data to reconstruct transformation coefficients, and the inverse transformer 33 may perform inverse transformation on the reconstructed coefficients to reconstruct residue values of the space domain.

In order to predict and reconstruct a current sample value by using the residue values of the space domain, intra prediction or motion compensation may be performed.

When the intra mode information is extracted by the entropy decoder 31, the intra predictor 35 may determine reference samples to be referred to, to reconstruct a current sample from among samples spatially adjacent to the current sample, by using the intra mode information. The reference samples may be selected from among the samples previously reconstructed by the reconstructor 34. The reconstructor 34 may reconstruct the current samples by using the reference samples determined based on the intra mode information and the residue values reconstructed by the inverse transformer 33.

When the intra mode information is extracted by the entropy decoder 31, the motion compensator 37 may determine reference samples to be referred to, to reconstruct a current sample of a current picture from among the pictures reconstructed previously to the current picture, by using the inter mode information. The inter mode information may include a differential value of a motion vector, a reference index, or the like By using the reference index, from among the pictures reconstructed previously to the current picture and stored in the reference picture buffer 36, a reference picture to be used to perform motion compensation on the current sample may be determined. A motion vector may be predicted by using the differential value of the motion vector, a reference block of the reference picture to be used to perform motion compensation on a current block may be determined by using the motion vector. The reconstructor 34 may reconstruct the current samples by using the reference block determined based on the intra mode information and the residue values reconstructed by the inverse transformer 33.

The reconstructor 34 may reconstruct samples and may output reconstructed samples. The reconstructor 34 may generate reconstructed samples of each of the largest coding units based on coding units of a tree structure.

The deblocking filter 38 may perform filtering for reducing a blocking phenomenon of samples located in a boundary region of the largest coding unit or each of the coding units of a tree structure.

Also, according to an embodiment, the offset applier 39 may adjust an offset of reconstruction samples of the current block, for example, each largest coding unit according to a sample adaptive offset method. The sample adaptive offset method may include an edge-type offset application method.

The offset applier 39 may determine an offset parameter of the current block, for example, an offset type, an offset class, and offset values, based on the offset information extracted by the entropy decoder 31.

In this case, the offset applier 39 may use an edge-type offset application method. When the edge-type offset application method is used, the offset applier 39 may determine an offset category of reconstruction samples based on a sample value gradient between a sample value of a current reconstruction sample of the current block and a sample value of a neighboring sample and a difference in the sample value gradient. The offset applier 39 may apply an offset according to the determined offset category to the reconstruction samples.

An operation of extracting an offset parameter from the offset information by the entropy decoder 31 may correspond to a parsing operation of the offset parameter acquirer 22 of FIG. 2A, and operations of the offset applier 39 may correspond to operations of the sample compensator 24 of the video decoding apparatus 20.

The offset applier 39 may determine a difference value and a sign of the offset value with respect to each of the reconstruction samples of the current block based on the offset value. The offset applier 39 may reduce an error between the reconstruction samples and the original samples by increasing or decreasing the sample value by the difference value determined based on the offset value with respect to each of the reconstruction samples.

According to an embodiment, a picture including the reconstruction samples offset-adjusted by the offset applier 39 may be stored in the reference picture buffer 36. Thus, according to an embodiment, by using a reference picture having a minimized error between the reconstruction samples and the original samples according to a sample adaptive offset method, motion compensation may be performed on a next picture.

According to a sample adaptive offset method according to an embodiment, an offset of a sample group including the reconstruction samples may be determined based on the difference values between the reconstructed samples and the original samples. First, embodiments of classifying the reconstruction samples into sample groups for the sample adaptive offset method according to an embodiment will be described in detail.

According to the sample adaptive offset method according to an embodiment, samples may be classified (i) according to an edge type of the reconstruction samples, or (ii) a band type of the reconstruction samples. According to an embodiment, whether samples are classified according to an edge type or a band type may be defined by using an offset type.

When an edge-type offset of the current block is determined, an offset class of each of the reconstruction samples included in the current block may be determined. That is, by comparing the sample values of current reconstruction samples and adjacent samples, an offset class of the current reconstruction samples may be defined. An example of determining an edge-type offset class will be described below with reference to FIG. 4.

Figures 4, 5:
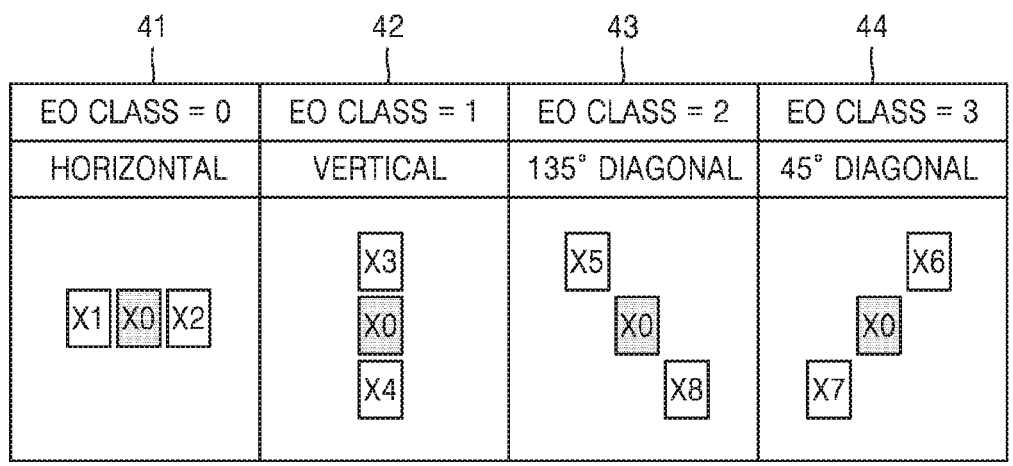
FIG. 4 illustrates an edge-type offset class according to an embodiment.
FIG. 5 illustrates an edge-type offset category according to an embodiment.

FIG. 4 illustrates an edge-type offset class according to an embodiment.

Referring to FIG. 4, according to an embodiment, indexes 0, 1, 2, and 3 may be sequentially allocated to edge-type offset classes 41, 42, 43, and 44.

According to an embodiment, an edge-type offset class may represent a one-dimensional edge direction formed by two adjacent samples adjacent to a current reconstruction sample X0. For example, according to an embodiment, an edge class may represent an edge direction of 0°, 90°, 45°, or 135°; however, the edge class is not limited thereto and may represent various other edge directions.

The edge class 41 having the index 0 indicates a case when an edge is formed by two adjacent samples X1 and X2 that are horizontally adjacent to the current reconstruction sample X0. In this case, the adjacent samples X1 and X2 may be respectively a first neighboring sample and a second neighboring sample that are located on opposite sides of the current reconstruction sample X0 along the horizontal direction.

The edge class 42 having the index 1 indicates a case when an edge is formed by two adjacent samples X3 and X4 that are vertically adjacent to the current reconstruction sample X0. In this case, the adjacent samples X3 and X4 may be respectively a first neighboring sample and a second neighboring sample that are located on opposite sides of the current reconstruction sample X0 along the vertical direction.

The edge class 43 having the index 2 indicates a case when an edge is formed by two adjacent samples X5 and X8 that are 135°-diagonally adjacent to the current reconstruction sample X0. In this case, the adjacent samples X5 and X8 may be respectively a first neighboring sample and a second neighboring sample that are located on opposite sides of the current reconstruction sample X0 along the 135°-diagonal direction.

The edge class 44 having the index 3 indicates a case when an edge is formed by two adjacent samples X6 and X7 that are 45°-diagonally adjacent to the current reconstruction sample X0. In this case, the adjacent samples X6 and X7 may be respectively a first neighboring sample and a second neighboring sample that are located on opposite sides of the current reconstruction sample X0 along the 45°-diagonal direction.

Thus, by analyzing the edge direction of the reconstruction samples included in the current block and thus determining a strong edge direction in the current block, an edge class of the current block may be determined. Also, neighboring samples of the current reconstruction sample may be determined according to the edge class of the current block.

Also, with respect to each edge class, categories of the current sample in the current block may be classified according to an edge shape of the current sample. An example of the categories according to the edge shape will be described below with reference to FIGS. 5 and 6.

Figure 6:
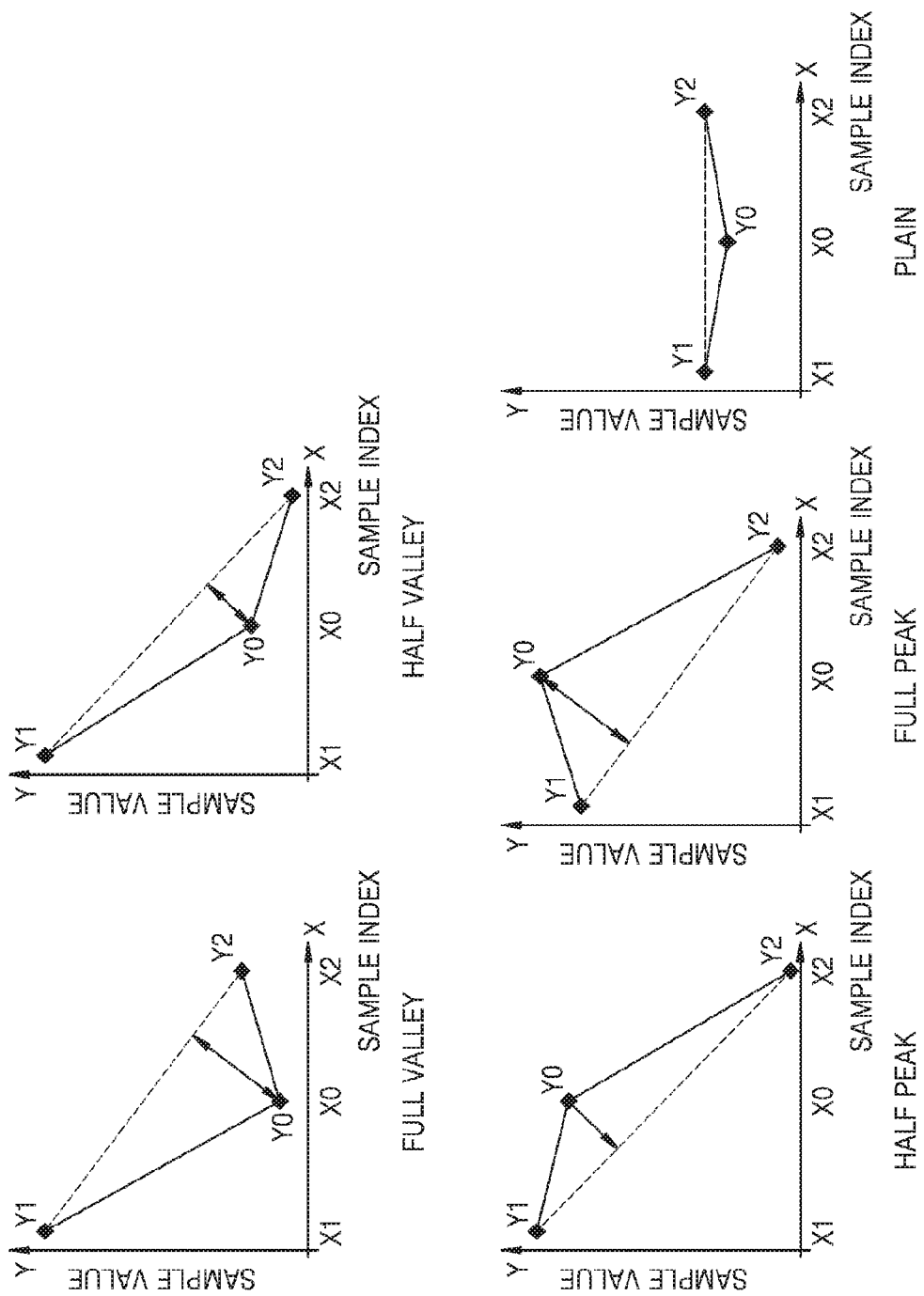
FIG. 6 illustrates graphs showing an edge-type offset category according to an embodiment.

FIGS. 5 and 6 illustrate edge-type offset categories according to an embodiment.

Referring to FIGS. 5 and 6, according to an embodiment, an edge-type category may indicate whether an edge of the current reconstruction sample in the current block corresponds to any one of the full valley, the half valley, the plain, the half peak, and the full peak. For example, the edge-type category may include five categories according to the edge shapes and strengths described above. Alternatively, the edge-type category may include four categories except the plain. Also, the edge-type category may include three categories of plain, valley, and peak; however, the edge-type category is not limited thereto and may include various categories.

FIG. 5 illustrates conditions for determining an edge category. FIG. 6 illustrates a graph showing edge bending strengths and edge shapes according to the sample values of the reconstruction sample and the neighboring samples.

Referring to FIG. 5, an offset category of the current reconstruction block may be determined by using a sample value Y0 of the current reconstruction sample X0 and sample values Y1 and Y2 of the neighboring samples X1 and X2. X0 may denote an index of the current reconstruction sample, and X1 and X2 may respectively denote indexes of the neighboring samples that are adjacent to opposite sides of the current reconstruction sample along each edge direction. In graphs of FIG. 6, an X axis may represent indexes of the reconstruction sample and the neighboring samples, and a Y axis may represent sample values of the samples.

According to an embodiment, an offset category of the current reconstruction sample may be determined based on a sample value gradient grad between the sample value Y0 of the current reconstruction sample X0 and the sample values Y1 and Y2 of the neighboring samples X1 and X2 and a sample value gradient difference y". For example, a sample value gradient difference y" in the current reconstruction sample may be determined as a pseudo-code below.

$$\text{grad1}=\text{Clip3}(-m,m,Y0-Y1)$$

$$\text{grad2}=\text{Clip3}(-m,m,Y2-Y0)$$

$$y''=\text{grad2}-\text{grad1}$$

Grad1 may be a first sample value gradient representing a sample value gradient between the current reconstruction sample and the first neighboring sample, and grad2 may be a second sample value gradient representing a sample value gradient between the current reconstruction sample and the second neighboring sample. According to an embodiment, the sample value gradient may be a value obtained by subtracting a previously-reconstructed sample value from a next-reconstructed sample value. In this case, a Clip3 function may be defined as follows.

$$\text{Clip3}(a,b,c)=a(\text{when, } c<a), b(\text{when, } c>b), \text{ or } c(\text{when, } a \leq c \leq b)$$

Referring to FIG. 6, the first sample value gradient grad1 may be understood as a slope of a line segment connecting the coordinate represented by the sample value Y0 of the current reconstruction sample X0 and the coordinate represented by the sample value Y1 of the first neighboring sample X1, and the second sample value gradient grad2 may be understood as a slope of a line segment connecting the coordinate represented by the sample value Y0 of the current reconstruction sample X0 and the coordinate represented by the sample value Y2 of the second neighboring sample X2.

"m" may denote a maximum value of the sample value gradient, and "−m" may denote a minimum value of the sample value gradient.

According to an embodiment, the sample value gradient difference y" may be determined by subtracting the first sample value gradient from the second sample value gradient. Referring to FIG. 6, according to an embodiment, the sample value gradient difference y" may be understood as a slope difference between two line segments on the coordinate plane. That is, on the coordinate plane, it may correspond to a slope variation at the coordinate (X0,Y0) represented by the sample value Y0 of the current reconstruction sample X0. Thus, the sample value gradient difference y" may represent the edge bending strength at the coordinate (X0,Y0) on the coordinate plane.

When the sample value gradient difference y" is determined, a category of the current reconstruction sample may be determined by comparing the sample value gradient difference y" may with a reference value (ThH, ThL). The reference value (ThH, ThL) may include a first reference value ThH for discriminating between the full valley and the half valley or between the full peak and the half peak and a second reference value ThL for determining whether the offset category is the plain or not.

Specifically, referring to FIG. 5, when the sample value gradient difference y" in the current reconstruction sample is greater than or equal to the first reference value ThH (ThH≤y"), the offset category of the current reconstruction sample may be determined as a category 1 (fully valley). Referring to FIG. 6, the category 1 (fully valley) may correspond to a case where an edge shape in the current reconstruction sample is a concave edge and an edge bending strength is strong.

Also, referring to FIG. 5, when the sample value gradient difference y" in the current reconstruction sample is smaller than the first reference value ThH and is greater than the second reference value ThL (ThH>y">ThL), the offset category of the current reconstruction sample may be determined as a category 2 (half valley). Referring to FIG. 6, the category 2 (half valley) may correspond to a case where an edge shape in the current reconstruction sample is a concave edge and an edge bending strength is weak.

Also, referring to FIG. 5, when the sample value gradient difference y" in the current reconstruction sample is greater than a negative value (−ThH) of the first reference value ThH and is smaller than a negative value (−ThL) of the second reference value ThL (−ThL>y">−ThH), the offset category of the current reconstruction sample may be determined as a category 3 (half peak). Referring to FIG. 6, the category 3 (half peak) may correspond to a case where an edge shape in the current reconstruction sample is a convex edge and an edge bending strength is weak.

Also, referring to FIG. 5, when the sample value gradient difference y" in the current reconstruction sample is smaller than a negative value (−ThH) of the first reference value ThH (y"≤−ThH), the offset category of the current reconstruction sample may be determined as a category 4 (fully peak). Referring to FIG. 6, the category 4 (full peak) may correspond to a case where an edge shape in the current reconstruction sample is a convex edge and an edge bending strength is strong.

Also, referring to FIG. 5, when the sample value gradient difference y" in the current reconstruction sample is smaller than or equal to the second reference value ThL and is greater than or equal to a negative value (−ThL) of the second reference value ThL ((−ThL≤y"≤ThL), the offset category of the current reconstruction sample may be determined as a category 0 (plain). Referring to FIG. 6, the category 0 (plain) may correspond to a case where an edge shape in the current reconstruction sample is a concave edge and an edge bending strength is very weak.

Alternatively, when the current reconstruction sample does not satisfy any of the conditions of the categories 1, 2, 3, and 4, since the current reconstruction sample may not correspond to an edge, it may be classified as the category 0 and an offset of the category 0 may not be encoded.

According to an embodiment, with respect to the reconstruction samples corresponding to the same category, an average value of the difference values between the reconstruction samples and the original samples may be determined as an offset of the current category. Also, an offset of each category may be determined.

The concave edges of the categories 1 and 2 may be smoothed when the reconstruction sample value is adjusted by using a positive offset value, and may be sharpened due to a negative offset value. The convex edges of the categories 3 and 4 may be smoothed due to a negative offset value and may be sharpened due to a positive offset value Since the edge bending strength of the concave edge of the category 1 may be stronger than the edge bending strength of the concave edge of the category 2, an absolute value of the offset of the category 1 may be greater than an absolute value of the offset of the category 2. Also, since the edge bending strength of the convex edge of the category 4 may be stronger than the edge bending strength of the convex edge of the category 3, an absolute value of the offset of the category 4 may be greater than an absolute value of the offset of the category 3.

According to an embodiment, the video encoding apparatus 10 may not allow the sharpening effect of an edge. In this case, the concave edges of the categories 1 and 2 may need a positive offset value, and the convex edges of the categories 3 and 4 may need a negative offset value. In this case, if a category of an edge is known, a sign of an offset value may be determined. Thus, the video encoding apparatus 10 and the video decoding apparatus 20 may not transmit the sign of the offset value and may transmit only an absolute value of the offset value.

Thus, the video encoding apparatus 10 may encode and transmit the offset values corresponding to categories of the current edge class, and the video decoding apparatus 20 may adjust each reconstruction sample of the category by the received offset value of each category.

For example, when an offset value of an edge type is determined as 0, the video encoding apparatus 10 may transmit only the offset use information of the current block indicating that an offset is not applied to the current block.

For example, when an offset value of an edge type is not 0, the video encoding apparatus 10 may transmit an absolute value of the offset as the offset value. The video encoding apparatus 10 may not need to transmit a sign of the offset value.

The video decoding apparatus 20 may read the offset use information of the current block from the received offset value, and may read the absolute value of the offset value when the offset value is not 0. The sign of the offset value may be predicted according to an edge category based on an edge shape of reconstruction samples and adjacent samples.

Thus, according to an embodiment, the video encoding apparatus 10 may determine a category of samples according to an edge shape according to an edge direction, and may determine an average error value between samples of each category as an offset value. The video encoding apparatus 10 may encode and transmit offset type information indicating an edge type, offset class information representing an edge direction, and offset values.

According to an embodiment, the video decoding apparatus 20 may receive the offset type information, the offset class information, and the offset values. The video decoding apparatus 20 may determine an edge direction of the current block according to the offset type information and the offset class information. In the same way as in the method performed by the video encoding apparatus 10 described above with respect to each of the reconstruction samples, the video decoding apparatus 20 may determine an offset category of the current reconstruction sample and may determine an offset corresponding to an offset category among the received offset values. The video decoding apparatus 20 may adjust a pixel value of the reconstruction sample by the determined offset value, thereby minimizing an error between an original image and a reconstruction image.

Hereinafter, a method of determining parameters used to determine an edge-type offset category according to an edge offset application method according to an embodiment will be described with reference to FIGS. 7A to 7E.

FIGS. 7A to 7E illustrate graphs showing an edge-type offset category according to various embodiments.

In the graphs of FIGS. 7A to 7E, edge-type offset categories according to various embodiments are represented in regions on the coordinate plane.

In the graphs of FIGS. 7A to 7E, an X axis may represent a second sample value gradient grad2 between a sample value of the current reconstruction sample and a sample value of the second neighboring sample, and a Y axis may represent a first sample value gradient grad1 between a sample value of the current reconstruction sample and a sample value of the first neighboring sample. In this case, the first neighboring sample may be a sample reconstructed before the current reconstruction sample, and the second neighboring sample may be a sample reconstructed after the current reconstruction sample.

Referring to the graphs of FIGS. 7A to 7E, a method of determining an edge-type offset category of the current reconstruction sample may be adjusted according to various embodiments. For example, according to various embodiments, the number of reconstruction samples belonging to the half valley and half peak category may be adjusted to be very small in the graph of FIG. 7A, and a reconstruction sample belonging to the full valley and full peak may be adjusted to be absent in the graph of FIG. 7C.

In this case, the number of reconstruction samples to apply an offset according to each category may be adjusted by using parameters. Specifically, the parameters may include reference values (ThH,ThL) to be compared with a sample value gradient difference of the reconstruction sample, and a maximum value "m" and a minimum value "−m" of a sample value gradient of the reconstruction sample.

For example, according to an embodiment, a first reference value ThH may be a reference value for discriminating between the full valley and the half valley or between the full peak and the half peak, and for example, it may be used to adjust the ratio between a reconstruction sample belonging to a full valley category and a reconstruction sample belonging to a half valley category and to adjust the ratio between a reconstruction sample belonging to a full peak category and a reconstruction sample belonging to a half peak category.

According to an embodiment, a second reference value ThL may be a reference value for discriminating whether the offset category of a reconstruction sample is the plain or not, and for example, it may be used to adjust the ratio between a reconstruction sample to which an offset is not applied and a reconstruction sample to which an offset is applied. For example, when an error in the reconstruction image is expected to be large, the ratio of a reconstruction sample belonging to a plain category may be reduced by setting the second reference value to be small, so that an offset may be applied to many reconstruction samples.

According to an embodiment, the sample value gradient difference may be determined with reference to the maximum value "m" and the minimum value "−m" of the sample value gradient of the reconstruction sample. According to an embodiment, the minimum value "−m" of the sample value gradient may be a negative value of the maximum value "m".

For example, when an absolute value of the sample value gradient acquired is excessively great, an excessive buffer space may be required to calculate the sample value gradient difference and an operation thereof may be unnecessarily complicated. Thus, for convenience of implementation and improvement of performance, the sample value gradient difference may be determined with reference to the maximum value "m" and the minimum value "−m" of the sample value gradient.

When the maximum value "m" is great, an error in the reconstruction image may be further minimized and thus encoding efficiency may be increased, and when the maximum value "m" is small, operation efficiency in an encoding/decoding process may be increased.

Thus, the number of reconstruction samples to apply an offset according to each category may be adjusted by adjusting the reference values (ThH,ThL) to be compared with the sample value gradient difference of the reconstruction sample and the maximum value "m" and the minimum value "−m" of the sample value gradient of the reconstruction sample.

Figure 7A:
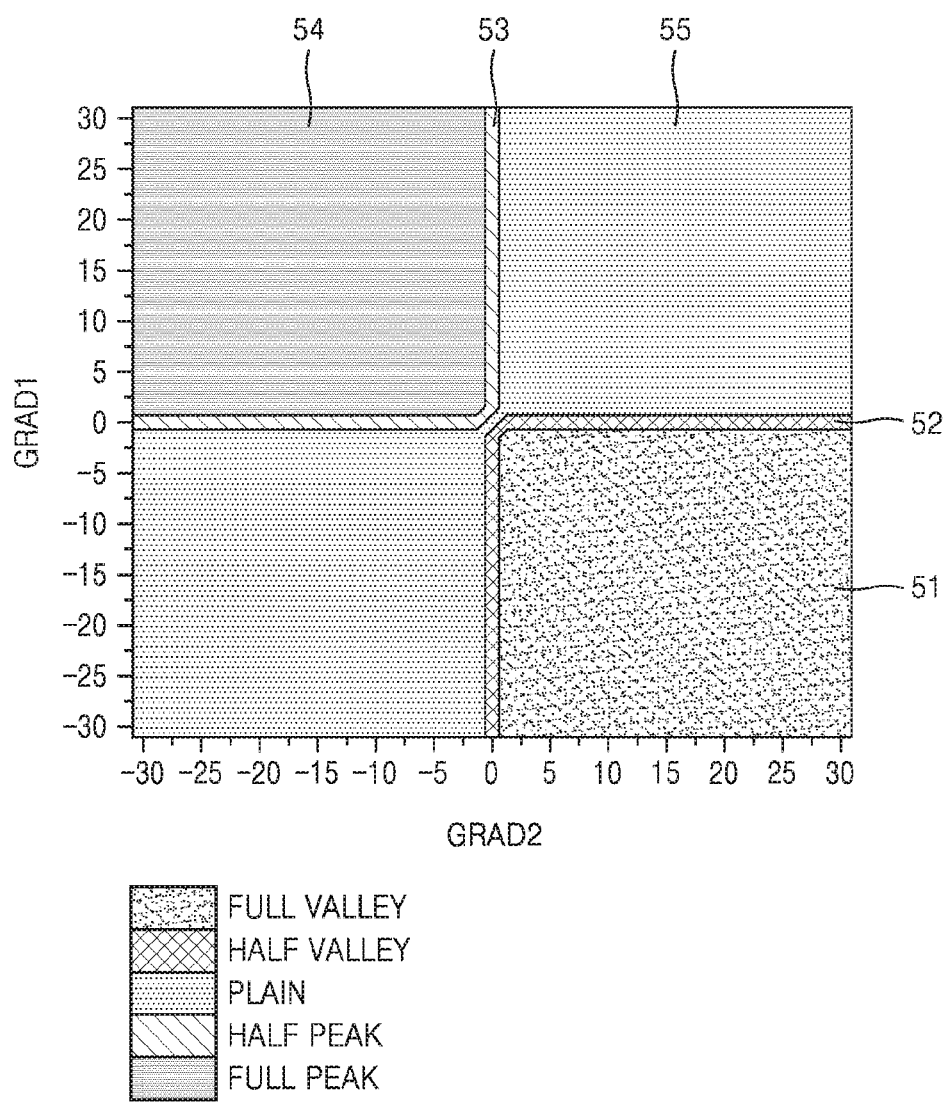
FIGS. 7A to 7E illustrate graphs showing an edge-type offset category according to various embodiments.

Referring to the graph of FIG. 7A, the first reference value ThH may be 2, the second reference value ThL may be 0, and the maximum value of the sample value gradient may be 1. In this case, a region 51 may represent a full valley category, a region 52 may represent a half valley category, a region 53 may represent a half peak category, a region 54 may represent a full peak category, and a region 55 may represent a plain category.

According to the classification of the graph of FIG. 7A, the offset category of the current reconstruction sample may be determined according to the comparison between a sample value of the current reconstruction sample and a sample value of the neighboring sample. Since the offset category of the current reconstruction sample may be determined as the half valley or half peak category only when the sample value of the current reconstruction sample is equal to the sample value of any one neighboring sample, the number of reconstruction samples belonging to the half valley or half peak category may be small.

Figure 7B:
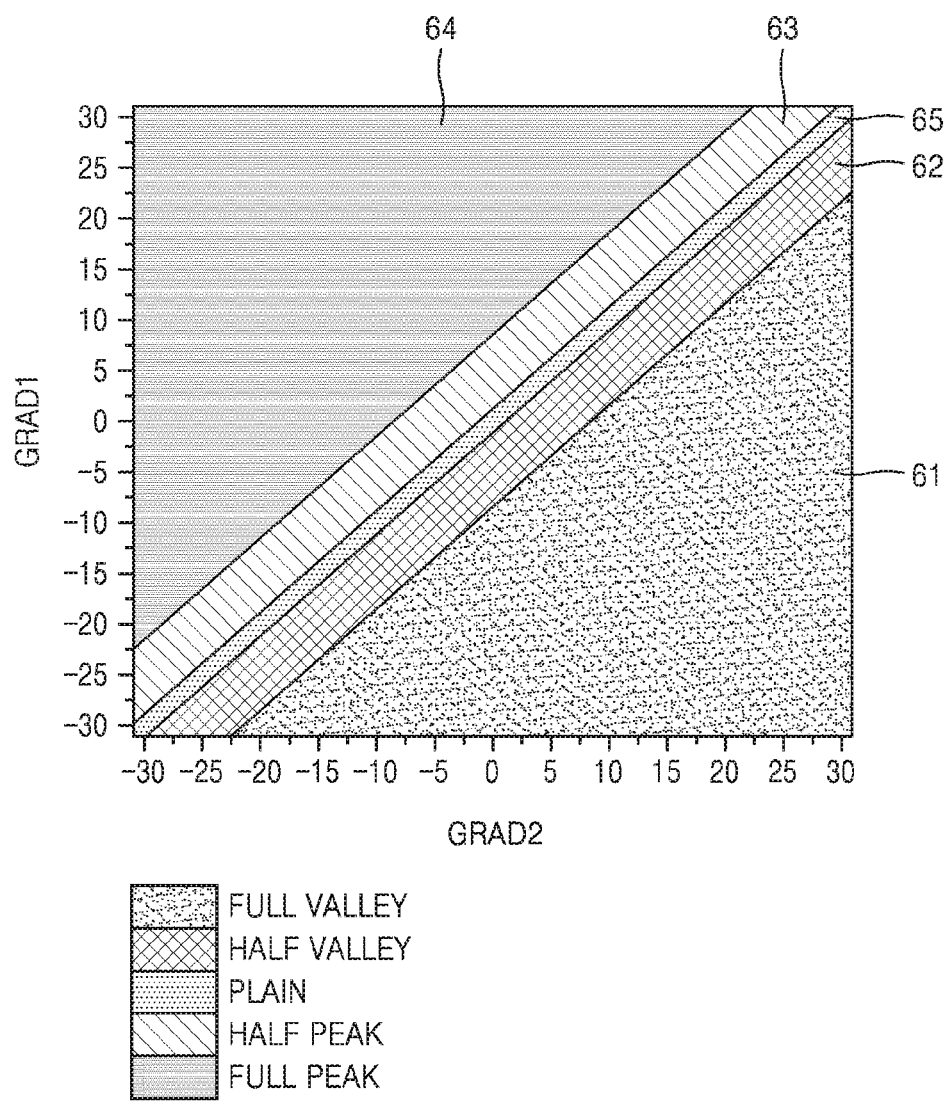

Referring to FIG. 7B, the first reference value ThH may be 9, the second reference value ThL may be 2, and the maximum value of the sample value gradient may be 255. That is, there may be no limit in the maximum value and the minimum value of the sample value gradient. In this case, a region 61 may represent a full valley category, a region 62 may represent a half valley category, a region 63 may represent a half peak category, a region 64 may represent a full peak category, and a region 65 may represent a plain category.

According to the classification of the graph of FIG. 7B, an error in the reconstruction image may be further minimized and thus encoding efficiency may be increased, but the sample value gradient may be large and thus operation efficiency may be reduced.

Figure 7C:
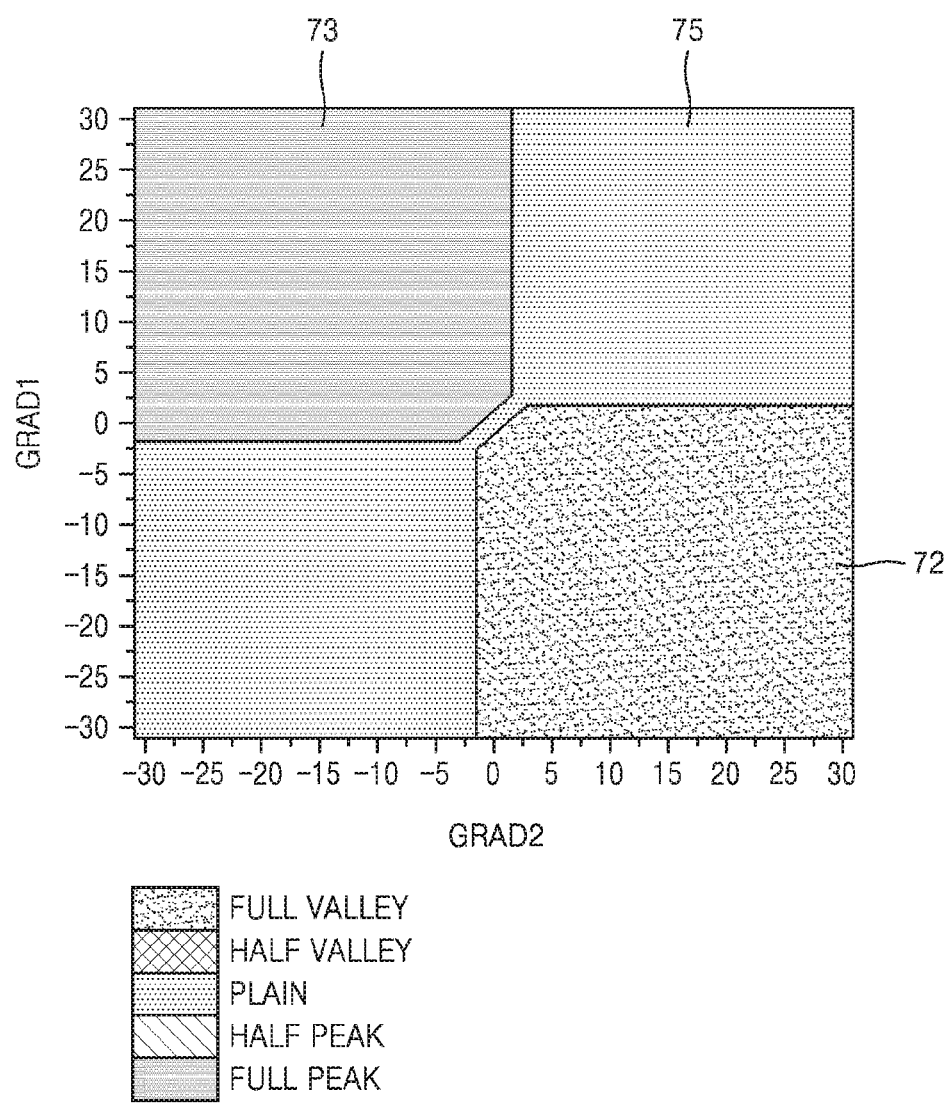

Referring to FIG. 7C, the first reference value ThH may be 9, the second reference value ThL may be 2, and the maximum value of the sample value gradient may be 3. In this case, there may be only three offset categories of reconstruction samples. That is, a region 72 may represent a half valley category, a region 73 may represent a half peak category, and a region 75 may represent a plain category. In this case, only two offsets for the half valley category and the half peak category may be determined.

Figure 7D:
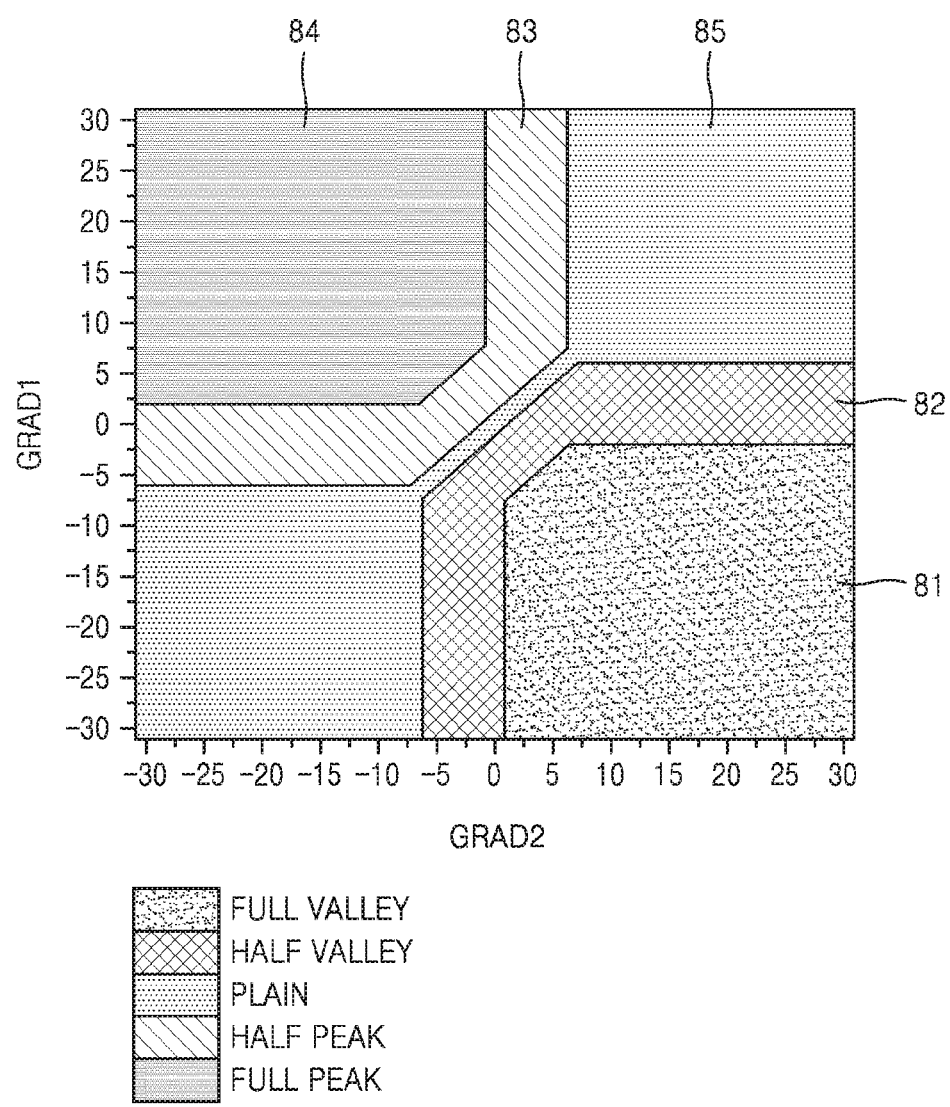

Referring to FIG. 7D, the first reference value ThH may be 9, the second reference value ThL may be 2, and the maximum value of the sample value gradient may be 7. In this case, a region 81 may represent a full valley category, a region 82 may represent a half valley category, a region 83 may represent a half peak category, a region 84 may represent a full peak category, and a region 85 may represent a plain category.

Figure 7E:
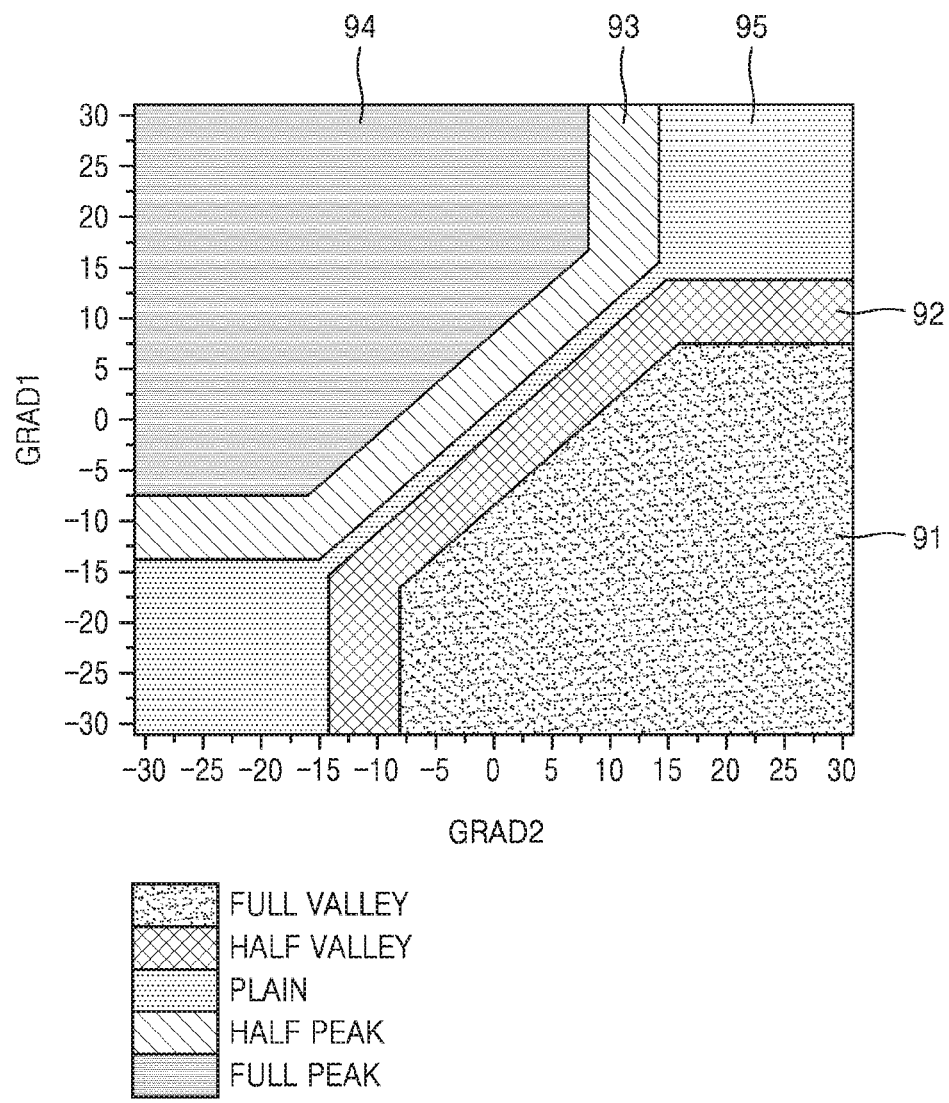

Referring to FIG. 7E, the first reference value ThH may be 9, the second reference value ThL may be 2, and the maximum value of the sample value gradient may be 16. In this case, a region 91 may represent a full valley category, a region 92 may represent a half valley category, a region 93 may represent a half peak category, a region 94 may represent a full peak category, and a region 95 may represent a plain category.

According to various embodiments, the reference values and the maximum value and the minimum value of the sample value gradient may be equally preset in the video encoding apparatus 10 and the video decoding apparatus 20.

Alternatively, according to various embodiments, the reference values and the maximum value and the minimum value of the sample value gradient may be determined based on a slice type of a slice including the current reconstruction sample. For example, the slice type may include a P slice, a B slice, and an I slice.

Alternatively, according to various embodiments, the reference values and the maximum value and the minimum value of the sample value gradient may be determined according to a quantization parameter (QP) of the current block.

Alternatively, according to various embodiments, the reference value and the maximum value and the minimum value of the sample value gradient may be transmitted as a syntax element in a bitstream. For example, the reference value may be included in a slice header, a sequence parameter set (SPS), or a picture parameter set (PPS).

Figures 8A, 8B:
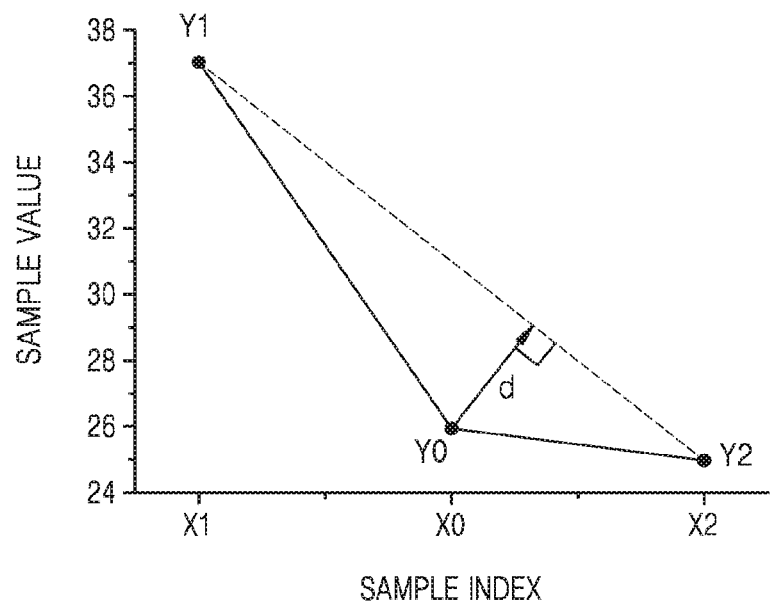
FIGS. 8A and 8B are diagrams illustrating an edge-type offset category according to another embodiment.

FIGS. 8A and 8B are diagrams illustrating an edge-type offset category according to another embodiment.

According to an embodiment, an edge-type offset category may be determined based on the curvature of a sample value in the current reconstruction sample. For example, by determining that the bending strength increases as the curvature of the sample value in the current reconstruction sample increases, an edge-type offset category may be determined such that an edge offset having a great absolute value may be applied.

Referring to FIG. 8A, a coordinate plane representing a current reconstruction sample and neighboring samples may be used to determine an edge-type offset category according to an embodiment. A graph of FIG. 8A may represent a two-dimensional coordinate plane having an X axis representing an index of neighboring samples and a reconstruction sample and a Y axis representing a sample value of each sample.

Referring to FIG. 8A, the coordinate (x0,y0) of a current reconstruction sample, the coordinate (x1,y1) of a first neighboring sample, and the coordinate (x2,y2) of a second neighboring sample are illustrated. For example, x0 may denote an index of the current reconstruction sample, and y0 may denote a sample value of the current reconstruction sample. In this case, a triangle having three points corresponding to the coordinate (x0,y0) of the current reconstruction sample, the coordinate (x1,y1) of the first neighboring sample, and the coordinate (x2,y2) of the second neighboring sample may appear.

Also, the curvature in the current reconstruction sample may be acquired by using a length "d" of a perpendicular line that is drawn from the coordinate point (x0,y0) representing the current reconstruction sample to a line segment connecting the coordinate (x1,y1) representing the first neighboring sample and the coordinate (x2,y2) representing the second neighboring sample. For example, the curvature in the current reconstruction sample may be proportional to the length "d" of the perpendicular line or the square of the length "d" of the perpendicular line.

According to an embodiment, a curvature "k" may be represented as follows by using a function y=f(x) representing the sample values of samples.

$$k=(y'')^2/(y'^2+1)$$

Herein, for example, y'=y2−y1, and y''=(y2−y0)−(y0−y1) =(y2−2y0+y1)).

Also, the curvature according to an embodiment may be represented as follows by using the square of the length "d" of the perpendicular line. The length "d" of the perpendicular line may be calculated by using a Hess formula or the like.

$$d^2=(y2-2y0+y1)^2/((y2-y1)^2+4)$$

Referring to FIG. 8B, an edge-type offset category according to an embodiment may be determined by comparing the acquired d^2 with a first reference value ThHd and a second reference value ThLd. Also, an offset category may be determined with reference to a sign of the sample value gradient (y''=(y2−2y0+y1)).

Specifically, when d^2 is greater than or equal to the first reference value ThHd and the sample value gradient difference is a positive value, an offset category of the current reconstruction sample may be determined as a category 1. The category 1 may be the full valley and may correspond to a case where an edge shape in the current reconstruction sample is a concave edge and the edge bending strength is strong.

Also, when d^2 is smaller than the first reference value ThHd and is greater than the second reference value ThLd and the sample value gradient difference is a positive value, an offset category of the current reconstruction sample may be determined as a category 2. The category 2 may be the half valley and may correspond to a case where an edge shape in the current reconstruction sample is a concave edge and the edge bending strength is weak.

Also, when d^2 is smaller than the first reference value ThHd and is greater than the second reference value ThLd and the sample value gradient difference is a negative value, an offset category of the current reconstruction sample may be determined as a category 3. The category 3 may be the half peak and may correspond to a case where an edge shape in the current reconstruction sample is a convex edge and the edge bending strength is weak.

Also, when d^2 is greater than or equal to the first reference value ThHd and the sample value gradient difference is a negative value, an offset category of the current reconstruction sample may be determined as a category 4. The category 4 may be the full peak and may correspond to a case where an edge shape in the current reconstruction sample is a convex edge and the edge bending strength is strong.

Also, when d^2 is smaller than or equal to the second reference value ThLd, an offset category of the current reconstruction sample may be determined as a category 0. The category 0 may be the plain and may correspond to a case where an edge shape in the current reconstruction sample is a convex edge or a concave edge and the edge bending strength is weak.

Alternatively, when the current reconstruction sample does not satisfy any of the conditions of the categories 1, 2, 3, and 4, since the current reconstruction sample may not correspond to an edge, it may be classified as the category 0 and an offset of the category 0 may not be encoded.

According to an embodiment, with respect to the reconstruction samples corresponding to the same category, an average value of the difference values between the reconstruction samples and the original samples may be determined as an offset of the current category. Also, an offset of each category may be determined.

According to an embodiment, the first reference value ThHd and the second reference value ThLd may be equally preset in the video encoding apparatus 10 and the video decoding apparatus 20.

Alternatively, according to an embodiment, the first reference value ThHd and the second reference value ThLd may be determined based on a slice type of a slice including the current reconstruction sample. For example, the slice type may include a P slice, a B slice, and an I slice.

Alternatively, according to an embodiment, the first reference value ThHd and the second reference value ThLd may be determined according to a quantization parameter (QP) of the current block.

Alternatively, according to an embodiment, the first reference value ThHd and the second reference value ThLd may be transmitted as a syntax element in a bitstream. For example, the reference values may be included in a slice header, a sequence parameter set (SPS), or a picture parameter set (PPS).

Figures 9A, 9B:
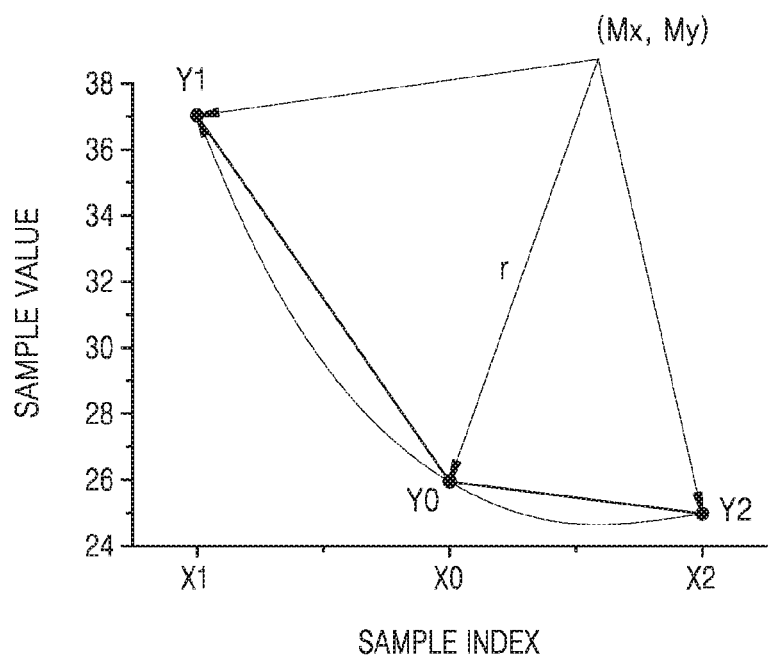
FIGS. 9A and 9B are diagrams illustrating an edge-type offset category according to another embodiment.

FIGS. 9A and 9B are diagrams illustrating an edge-type offset category according to another embodiment.

According to an embodiment, an edge-type offset category may be determined based on a radius of a circle passing through three points corresponding to a sample value of a current reconstruction sample, a sample value of a first neighboring sample, and a sample value of a second neighboring sample on a coordinate plane.

Referring to FIG. 9A, a coordinate plane representing a current reconstruction sample and neighboring samples may be used to determine an edge-type offset category according to an embodiment. A graph of FIG. 9A may represent a two-dimensional coordinate plane having an X axis representing an index of neighboring samples and a reconstruction sample and a Y axis representing a sample value of each sample.

Referring to FIG. 9A, the coordinate (x0,y0) of a current reconstruction sample, the coordinate (x1,y1) of a first neighboring sample, and the coordinate (x2,y2) of a second neighboring sample are illustrated. For example, x0 may denote an index of the current reconstruction sample, and y0 may denote a sample value of the current reconstruction sample. In this case, a circle passing through three points corresponding to the coordinate (x0,y0) of the current reconstruction sample, the coordinate (x1,y1) of the first neighboring sample, and the coordinate (x2,y2) of the second neighboring sample may appear. An edge-type offset category according to an embodiment may be determined by using a radius "r" of a circle passing through three points. For example, as the radius "r" of a circle passing through three points decreases, the edge bending strength may increase and a greater offset may need to be applied.

For example, a radius "r" and a center coordinate (Mx, My) of a circle passing through three points corresponding to the coordinate (x0,y0) representing the current reconstruction sample, the coordinate (x1,y1) representing the first neighboring sample, and the coordinate (x2,y2) representing the second neighboring sample may be acquired by using three equations below.

$$(Mx-x1)^2+(My-y1)^2=r^2$$

$$(Mx-x0)^2+(My-y0)^2=r^2$$

$$(Mx-x2)^2+(My-y2)^2=r^2$$

Referring to FIG. 9B, an edge-type offset category according to an embodiment may be determined by comparing a reciprocal number of the squire $r^2$ of the radius "r" with a first reference value ThHr and a second reference value ThLr. Also, an offset category may be determined with reference to the y coordinate (My) of the center of the circle.

Specifically, when the reciprocal number of the square of the radius is greater than or equal to the first reference value ThHr and the y coordinate of the center of the circle is greater than the y coordinate of the current reconstruction sample, an offset category of the current reconstruction sample may be determined as a category 1. The category 1 may be the full valley and may correspond to a case where an edge shape in the current reconstruction sample is a concave edge and the edge bending strength is strong.

Also, when the reciprocal number of the square of the radius is smaller than the first reference value ThHr and is greater than the second reference value ThLr and the y coordinate of the center of the circle is greater than the y coordinate of the current reconstruction sample, an offset category of the current reconstruction sample may be determined as a category 2. The category 2 may be the half valley and may correspond to a case where an edge shape in the current reconstruction sample is a concave edge and the edge bending strength is weak.

Also, when the reciprocal number of the square of the radius is smaller than the first reference value ThHr and is greater than the second reference value ThLr and the y coordinate of the center of the circle is smaller than the y coordinate of the current reconstruction sample, an offset category of the current reconstruction sample may be determined as a category 3. The category 3 may be the half peak and may correspond to a case where an edge shape in the current reconstruction sample is a convex edge and the edge bending strength is weak.

Also, when the reciprocal number of the square of the radius is greater than or equal to the first reference value ThHr and the y coordinate of the center of the circle is smaller than the y coordinate of the current reconstruction sample, an offset category of the current reconstruction sample may be determined as a category 4. The category 4 may be the full peak and may correspond to a case where an edge shape in the current reconstruction sample is a convex edge and the edge bending strength is strong.

Also, when the reciprocal number of the square of the radius is smaller than or equal to the second reference value ThLr, an offset category of the current reconstruction sample may be determined as a category 0. The category 0 may be the plain and may correspond to a case where an edge shape in the current reconstruction sample is a convex edge or a concave edge and the edge bending strength is weak.

Alternatively, when the current reconstruction sample does not satisfy any of the conditions of the categories 1, 2, 3, and 4, since the current reconstruction sample may not correspond to an edge, it may be classified as the category 0 and an offset of the category 0 may not be encoded.

According to an embodiment, with respect to the reconstruction samples corresponding to the same category, an average value of the difference values between the reconstruction samples and the original samples may be determined as an offset of the current category. Also, an offset of each category may be determined.

According to an embodiment, the first reference value ThHr and the second reference value ThLr may be equally preset in the video encoding apparatus 10 and the video decoding apparatus 20.

Alternatively, according to an embodiment, the first reference value ThHr and the second reference value ThLr may be determined based on a slice type of a slice including the current reconstruction sample. For example, the slice type may include a P slice, a B slice, and an I slice.

Alternatively, according to an embodiment, the first reference value ThHr and the second reference value ThLr may be determined according to a quantization parameter (QP) of the current block.

Alternatively, according to an embodiment, the first reference value ThHr and the second reference value ThLr may be transmitted as a syntax element in a bitstream. For example, the reference values may be included in a slice header, a sequence parameter set (SPS), or a picture parameter set (PPS).

Figures 10A, 10B:
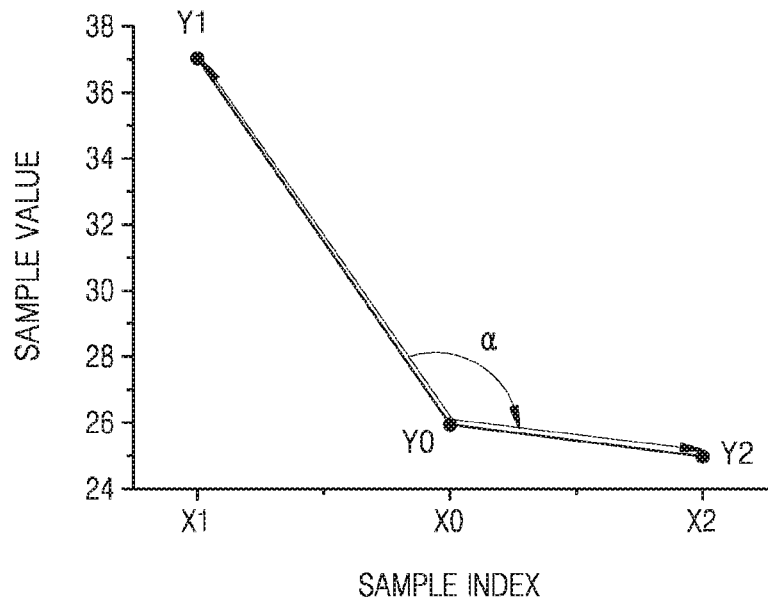
FIGS. 10A and 10B are diagrams illustrating an edge-type offset category according to another embodiment.

FIGS. 10A and 10B are diagrams illustrating an edge-type offset category according to another embodiment.

According to an embodiment, an edge-type offset category may be determined based on an angle between three points corresponding to a sample value of a current reconstruction sample, a sample value of a first neighboring sample, and a sample value of a second neighboring sample on a coordinate plane.

Referring to FIG. 10A, a coordinate plane representing a current reconstruction sample and neighboring samples may be used to determine an edge-type offset category according to an embodiment. A graph of FIG. 10A may represent a two-dimensional coordinate plane having an X axis representing an index of neighboring samples and a reconstruction sample and a Y axis representing a sample value of each sample.

Referring to FIG. 10A, the coordinate (x0,y0) of a current reconstruction sample, the coordinate (x1,y1) of a first neighboring sample, and the coordinate (x2,y2) of a second neighboring sample are illustrated. For example, x0 may denote an index of the current reconstruction sample, and y0 may denote a sample value of the current reconstruction sample. In this case, a first line segment connecting the coordinate (x0,y0) representing the reconstruction sample and the coordinate (x1,y1) representing the first neighboring sample and a second line segment connecting the coordinate (x0,y0) representing the reconstruction sample and the coordinate (x2,y2) representing the second neighboring sample may appear. In this case, a slope of the first line segment may represent a sample value gradient between the current reconstruction sample and the first neighboring sample, and a slope of the second line segment may represent a sample value gradient between the current reconstruction sample and the second neighboring sample.

An edge-type offset category according to an embodiment may be acquired by using an angle α between the first line segment and the second line segment. For example, the angle α between the first line segment and the second line segment may be acquired as follows. In this case, an inner product formula of a first vector corresponding to the first line segment and a second vector corresponding to the second line segment may be used.

$$\cos{}^2(\alpha)=((x1-x0)*(x2-x0)+(y1-y0)*(y2-y0))^2/ (((x1-x0)^2+(y1-y0)^2)*((x2-x0)^2+(y2-y0)^2))$$

In this case, when the first neighboring sample and the second neighboring sample are respectively samples that are adjacent to the left side and the right side of the current reconstruction sample, since x1−x0=−1 and x2−x0=1, it may be represented as follows.

$$\cos{}^2(\alpha)=((y1-y0)*(y2-y0)-1)^2/(((y1-y0)^2+1)* ((y2-y0)^2+1))$$

Since α approaches 180° as cos ^2(α) approaches 1, the edge bending strength may decrease.

Referring to FIG. 10B, an edge-type offset category according to an embodiment may be determined by comparing a reciprocal number of cos ^2(α) with a first reference value ThHa+1 and a second reference value ThLa+1. Also, an offset category may be determined with reference to a sign of the sample value gradient (y"=(y2−2y0+y1)).

Specifically, when 1/cos ^2(α) is greater than or equal to the first reference value ThHa+1 and the sample value gradient difference is a positive value, an offset category of the current reconstruction sample may be determined as a category 1. The category 1 may be the full valley and may correspond to a case where an edge shape in the current reconstruction sample is a concave edge and the edge bending strength is strong.

Also, when 1/cos ^2(α) is smaller than the first reference value ThHa+1 and is greater than the second reference value ThLa+1 and the sample value gradient difference is a positive value, an offset category of the current reconstruction sample may be determined as a category 2. The category 2 may be the half valley and may correspond to a case where an edge shape in the current reconstruction sample is a concave edge and the edge bending strength is weak.

Also, when 1/cos ^2(α) is smaller than the first reference value ThHa+1 and is greater than the second reference value ThLa+1 and the sample value gradient difference is a negative value, an offset category of the current reconstruction sample may be determined as a category 3. The category 3 may be the half peak and may correspond to a case where an edge shape in the current reconstruction sample is a convex edge and the edge bending strength is weak.

Also, when 1/cos ^2(α) is greater than or equal to the first reference value ThHa+1 and the sample value gradient difference is a negative value, an offset category of the current reconstruction sample may be determined as a category 4. The category 4 may be the full peak and may correspond to a case where an edge shape in the current reconstruction sample is a convex edge and the edge bending strength is strong.

Also, when 1/cos ^2(α) is smaller than or equal to the second reference value ThLa+1, an offset category of the current reconstruction sample may be determined as a category 0. The category 0 may be the plain and may correspond to a case where an edge shape in the current reconstruction sample is a convex edge or a concave edge and the edge bending strength is weak.

Alternatively, when the current reconstruction sample does not satisfy any of the conditions of the categories 1, 2, 3, and 4, since the current reconstruction sample may not correspond to an edge, it may be classified as the category 0 and an offset of the category 0 may not be encoded.

According to an embodiment, with respect to the reconstruction samples corresponding to the same category, an average value of the difference values between the reconstruction samples and the original samples may be determined as an offset of the current category. Also, an offset of each category may be determined.

According to an embodiment, the first reference value ThHa and the second reference value ThLa may be equally preset in the video encoding apparatus 10 and the video decoding apparatus 20.

Alternatively, according to an embodiment, the first reference value ThHa and the second reference value ThLa may be determined based on a slice type of a slice including the current reconstruction sample. For example, the slice type may include a P slice, a B slice, and an I slice.

Alternatively, according to an embodiment, the first reference value ThHa and the second reference value ThLa may be determined according to a quantization parameter (QP) of the current block.

Alternatively, according to an embodiment, the first reference value ThHa and the second reference value ThLa may be transmitted as a syntax element in a bitstream. For example, the reference values may be included in a slice header, a sequence parameter set (SPS), or a picture parameter set (PPS).

As described above, according to various embodiments, in the video encoding apparatus 10 and the video decoding apparatus 20 or 30, blocks for splitting video data may be split into largest coding units, encoding/decoding may be performed based on coding units of a tree structure for each largest coding unit, and an offset value according to sample classification may be determined for each largest coding unit. Hereinafter, a video encoding method and apparatus, and a video decoding method and apparatus based on coding units and transformation units of a tree structure, according to an embodiment, will be described with reference to FIGS. 11 through 30.

Figure 11:
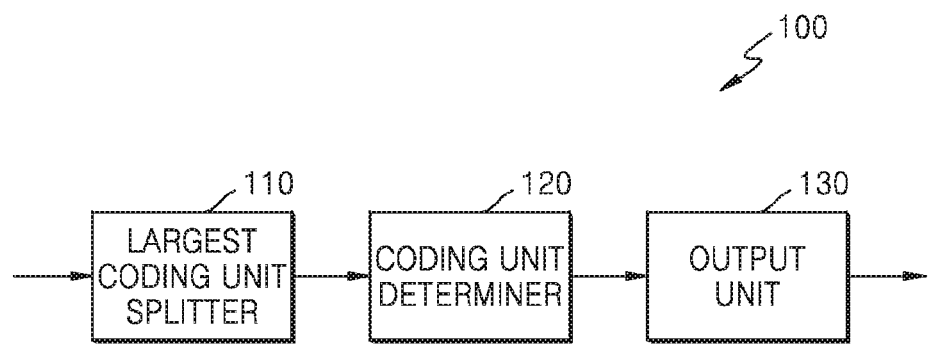
FIG. 11 illustrates a block diagram of a video encoding apparatus based on coding units of a tree structure, according to an embodiment of the present disclosure.

FIG. 11 is a block diagram of a video encoding apparatus based on coding units according to tree structure 100, according to an embodiment of the present disclosure.

The video encoding apparatus involving video prediction based on coding units of a tree structure 100 according to an embodiment includes a largest coding unit splitter 110, a coding unit determiner 120, and an output unit 130. Hereinafter, for convenience of description, the video encoding apparatus involving video prediction based on coding units of the tree structure 100 is referred to as the 'video encoding apparatus 100'.

The largest coding unit splitter 110 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2. The image data may be output to the coding unit determiner 120 according to at least one largest coding unit.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit is an uppermost depth and a depth of the smallest coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. In other words, the coding unit determiner 120 determines a coded depth by encoding the image data in the deeper coding units according to depths, according to the largest coding unit of the current picture, and selecting a depth having the minimum encoding error. The determined coded depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the minimum encoding error may be selected after comparing encoding errors of the deeper coding units. At least one coded depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors according to depths may differ according to regions in the one largest coding unit, and thus the coded depths may differ according to regions in the image data. Thus, one or more coded depths may be determined in one largest coding unit, and the image data of the largest coding unit may be divided according to coding units of at least one coded depth.

Accordingly, the coding unit determiner 120 according to the embodiment may determine coding units having a tree structure included in the current largest coding unit. The 'coding units having a tree structure' according to an embodiment include coding units corresponding to a depth determined to be the coded depth, from among all deeper coding units included in the current largest coding unit. A coding unit of a coded depth may be hierarchically determined according to depths in the same region of the largest coding unit, and may be independently determined in different regions. Equally, a coded depth in a current region may be independently determined from a coded depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to the embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a coded depth according to an embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type may include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, partitions having arbitrary shapes, or the like.

A prediction mode of the prediction unit may be at least one of an intra mode, an inter mode, and a skip mode. For example, the intra mode and the inter Mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 100 according to the embodiment may also perform the transformation on the image data in a coding unit based on not only the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information for each coding depth may require not only a coded depth but also prediction-related information and transformation-related information. Accordingly, the coding unit determiner 120 not only determines a coded depth having a minimum encoding error but also determines a partition mode in which a prediction unit is split to partitions, a prediction type according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 12 through 23.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one coded depth determined by the coding unit determiner 120, and encoding mode information according to depths.

The encoded image data may be obtained by encoding residual data of an image.

The encoding mode information according to depths may include coded depth information, partition type information of a prediction unit, prediction mode information, and transformation unit size information.

Coded depth information may be defined by using split information according to depths, which specifies whether encoding is performed on coding units of a lower depth instead of a current depth If the current depth of the current coding unit is a coded depth, the current coding unit is encoded, and thus the split information may be defined not to split the current coding unit to a lower depth. On the contrary, if the current depth of the current coding unit is not the coded depth, the encoding has to be performed on the coding unit of the lower depth, and thus the split information of the current depth may be defined to split the current coding unit to the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since coding units of a tree structure are determined in one largest coding unit and information about at least one coding mode is to be determined for each coding unit of a coding depth, information about at least one coding mode may be determined for one largest coding unit. Also, a coded depth of the image data of the largest coding unit may be different according to locations since the image data is hierarchically split according to depths, and thus information about the coded depth and the encoding mode may be set for the image data.

Accordingly, the output unit 130 according to the embodiment may assign encoding information about a corresponding coded depth and an encoding mode to at least one of the coding unit, the prediction unit, and a minimum unit included in the largest coding unit.

The minimum unit according to an embodiment is a square data unit obtained by splitting the smallest coding unit constituting the lowermost coded depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction of an inter mode, about a reference image index of the inter mode, about a motion vector, about a chroma sample of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output an offset parameter related to an offset adjusting method described above with reference to FIGS. 1A to 10B.

In the video encoding apparatus 100 according to the simplest embodiment, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The video encoding apparatus 100 of FIG. 11 may perform an operation of the video encoding apparatus 10 described above with reference to FIG. 1A.

The coding unit determiner 120 may perform an operation of the offset parameter determiner 12 of the video encoding apparatus 10. An offset type, offset values of each category, and an offset class may be determined for each largest coding unit.

The output unit 130 may perform an operation of the bitstream generator 14. The offset parameter determined for each largest coding unit may be output. Offset merge information indicating whether to use an offset parameter of the largest coding unit adjacent to the current largest coding unit as a current offset parameter may be first output. An off type, an edge type, or a band type may be output as an offset type. An offset value may be output in the order of zero value information, sign information, and a remaining offset value. In the case of an edge type, code information of an offset value may not be output.

When the offset merge information of a current largest coding unit allows the use of an offset parameter of an adjacent largest coding unit, an offset value and an offset type of the current largest coding unit may not be output.

Figure 12:
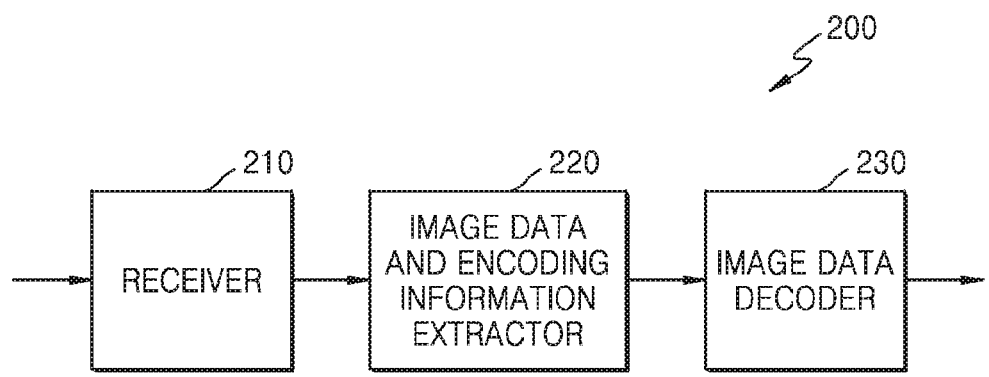
FIG. 12 illustrates a block diagram of a video decoding apparatus based on coding units of a tree structure, according to an embodiment of the present disclosure.

FIG. 12 is a block diagram of a video decoding apparatus based on coding units according to tree structure 200, according to an embodiment of the present disclosure.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and information about various encoding modes, for decoding operations by the video decoding apparatus 200 are identical to those described with reference to FIG. 11 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a coded depth and encoding mode information for the coding units having a tree structure according to each largest coding unit, from the parsed bitstream. The extracted coded depth and encoding mode information are output to the image data decoder 230. That is, the image data in a bit stream is split into the largest coding unit so that the image data decoder 230 decodes the image data for each largest coding unit.

Information about a coding mode and a coding depth for each largest coding unit may be set for one or more coding depth information, and information about a coding mode for each coding depth may include partition type information of a coding unit, prediction mode information, size information of a transformation unit, and the like. Also, split information according to depths may be extracted as the information about a coded depth.

The information about the coding depth and the coding mode for each largest coding unit extracted by the image data and encoding information extractor 220 may be information about a coding depth and a coding mode determined to generate a minimum encoding error when an encoder, such as the video encoding apparatus 100 according to an embodiment, repeatedly performs encoding for each depth-by-depth coding unit for each largest coding unit. Accordingly, the video decoding apparatus 200 may reconstruct an image by decoding data according to an encoding method that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the coded depth and the encoding mode information according to the predetermined data units. When coded depth and encoding mode information of a corresponding largest coding unit is assigned to each of predetermined data units, the predetermined data units to which the same coded depth and encoding mode information is assigned may be inferred to be the data units included in the same largest coding unit.

The image data decoder 230 may reconstruct the current picture by decoding the image data of each largest coding unit based on the information about the coding mode and the coding depth for each largest coding unit. That is, the image data decoder 230 may decode the encoded image data, based on a read partition type, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction type of each coding unit, based on the information about the partition mode and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each largest coding unit. Via the inverse transformation, a pixel value of a space domain of the coding unit may be reconstructed.

The image data decoder 230 may determine a coded depth of a current largest coding unit by using split information according to depths. If the split information indicates that image data is no longer split in the current depth, the current depth is a coded depth. Accordingly, the image data decoder 230 may decode the image data of the current largest coding unit by using the information about the partition type of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Also, the video decoding apparatus 200 of FIG. 12 may perform an operation of the video decoding apparatus 20 described above with reference to FIG. 2A.

The receiver 210 of the image data and encoding information extractor 220 may perform an operation of the offset parameter acquirer 22 of the video decoding apparatus 20. The image data decoder 230 may perform an operation of the sample compensator 24 of the video decoding apparatus 20.

When only the offset merge information is parsed from a bitstream without an offset parameter for a current largest coding unit, the image data and encoding information extractor 220 may reconstruct a current offset parameter to be equal to at least one of the adjacent offset parameters. Which of the adjacent offset parameters will be referred to may be determined based on the offset merge information. Based on the offset merge information for the current largest coding unit parsed from the bitstream, when it is determined that the adjacent offset parameters and the current offset parameter are different from each other, the image data and encoding information extractor 220 may parse and reconstruct the current offset parameter for the current largest coding unit from the bitstream.

The image data and encoding information extractor 220 may parse the offset parameter for each largest coding unit from the bitstream. An offset type, offset values of each category, and an offset class may be determined from the offset parameter. When an offset type of the current largest coding unit is an off type, an offset adjusting operation on the current largest coding unit may be ended. When the offset type is an edge type, a current offset value may be selected among the received offset values based on a category representing an edge type and an edge class representing each edge direction for each of the reconstruction samples. When the offset type is a band type, each band may be determined for each of the reconstruction samples and an offset value corresponding to a current band may be selected among the offset values.

The image data decoder 230 may generate a reconstruction sample having a minimized error with respect to the original sample by adjusting the reconstruction sample value by the offset value corresponding to each of the reconstruction samples. An offset of the reconstruction samples of the largest coding unit may be adjusted based on the offset parameter parsed for each largest coding unit.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimum encoding mode information received from an encoder.

Figure 13:
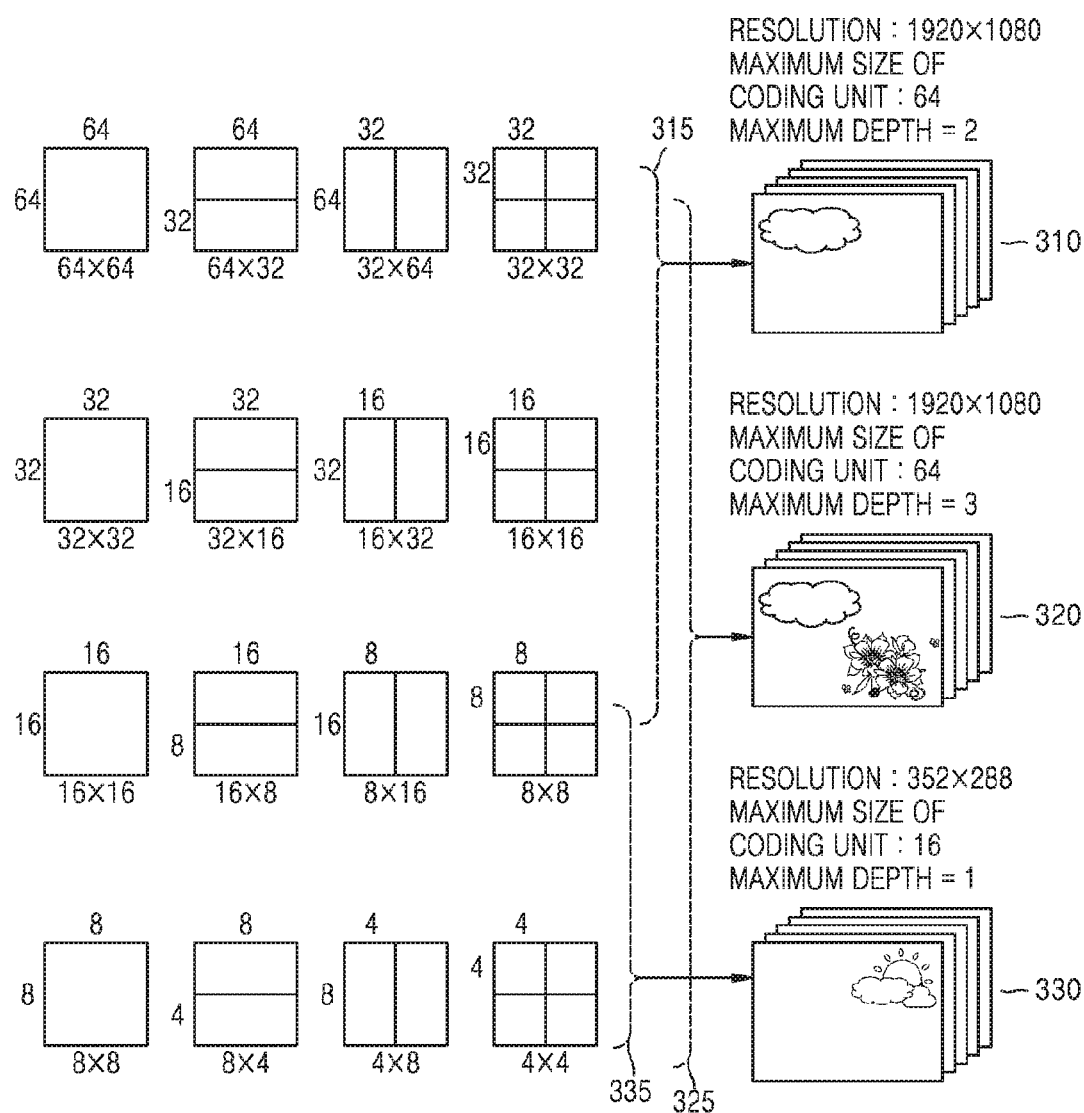
FIG. 13 illustrates a concept of coding units, according to an embodiment of the present disclosure.

FIG. 13 illustrates a concept of coding units, according to an embodiment of the present disclosure.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 14 denotes a total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the video data 310 may include a largest coding unit having a long axis size of 64, and coding units having long axis sizes of 32 and 16 since depths are deepened to two layers by splitting the largest coding unit twice. Since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 14:
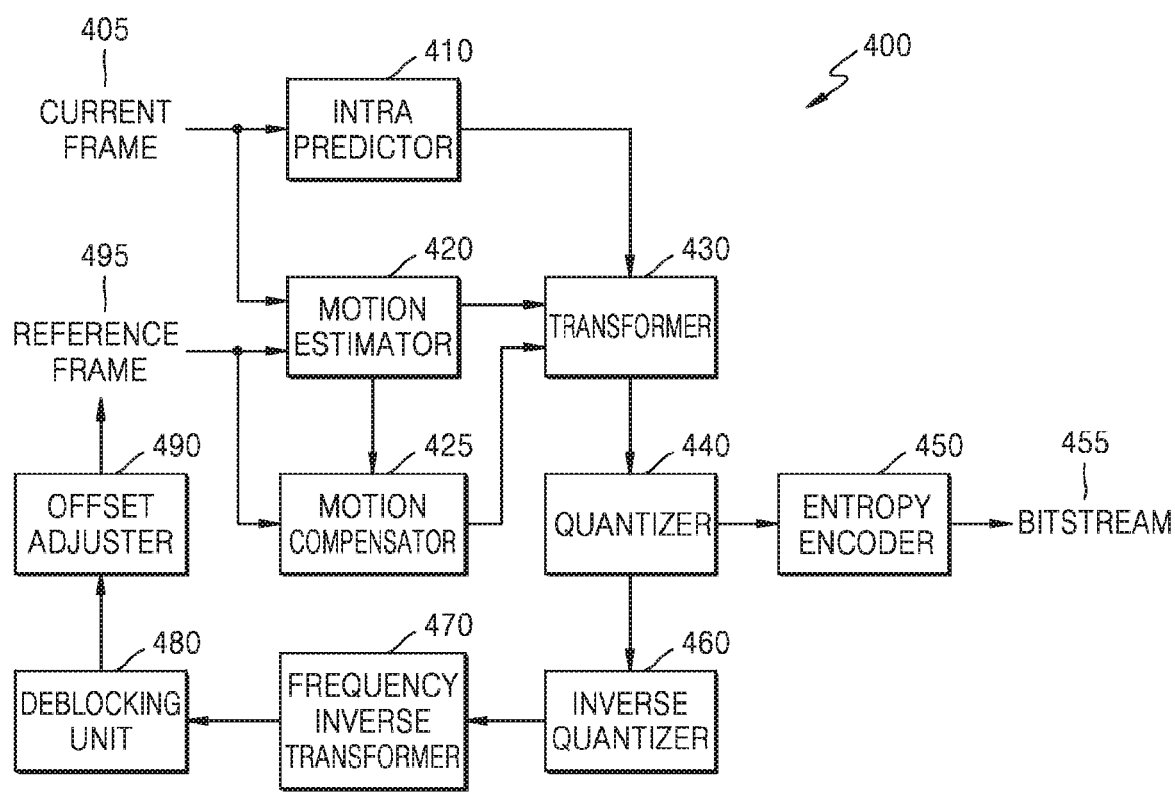
FIG. 14 is a block diagram of an image encoder based on coding units, according to an embodiment of the present disclosure.

FIG. 14 is a block diagram of an image encoder 400 based on coding units, according to an embodiment of the present disclosure.

The image encoder 400 according to an embodiment includes operations of the coding unit determiner 120 of the video encoding apparatus 100 so as to encode image data. That is, an intra predictor 410 performs intra prediction on coding units in an intra mode, with respect to a current frame 405, and a motion estimator 420 and a motion compensator 425 respectively perform inter estimation and motion compensation on coding units in an inter mode by using the current frame 405 and a reference frame 495.

The data output from the intra predictor 410, the motion estimator 420, and the motion compensator 425 may be output as a quantized transformation coefficient through a transformer 430 and a quantizer 440. The quantized transformation coefficient may be reconstructed as data of a spatial domain through an inverse quantizer 460 and an inverse transformer 470, and the reconstructed data of the spatial domain may be output as the reference frame 495 after being post-processed through a deblocking unit 480 and an offset adjuster 490. The quantized transformation coefficient may be output as a bitstream 455 through an entropy encoder 450.

In order for the video encoder 300 to be applied in the video encoding apparatus 100, all elements of the video encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the offset adjuster 490, have to perform operations based on each coding unit from among coding units having a tree structure while considering the maximum depth of each largest coding unit.

Specifically, the intra predictor 410, the motion estimator 420, and the motion compensator 425 determine partitions and a prediction mode of each coding unit from among the coding units having a tree structure while considering the maximum size and the maximum depth of a current largest coding unit, and the transformer 430 determines the size of the transformation unit in each coding unit from among the coding units having a tree structure.

The image encoder 400 may classify samples according to an edge type (or a band type) for each largest coding unit of the reference frame 495, may determine an edge direction (or a start band position), and may determine an average error value of the reconstruction samples belonging to each category. Each offset use information, offset merge information, and an offset parameter may be encoded and signaled for each largest coding unit.

Figure 15:
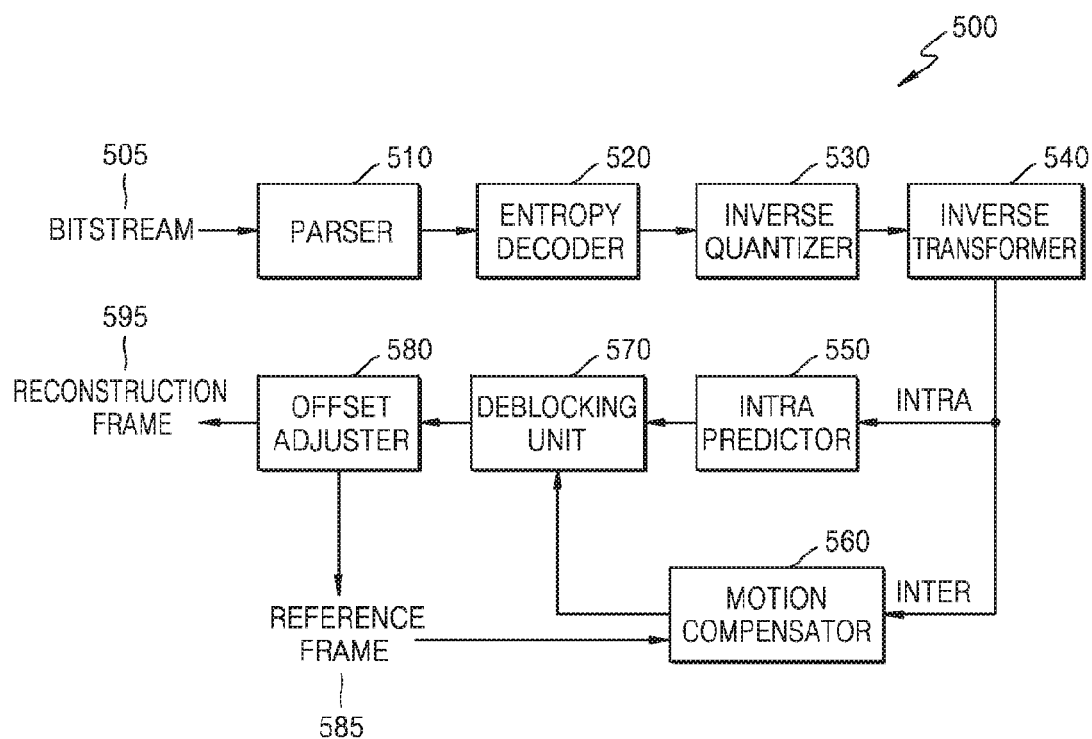
FIG. 15 is a block diagram of an image decoder based on coding units, according to an embodiment of the present disclosure.

FIG. 15 is a block diagram of an image decoder based on coding units 500, according to an embodiment of the present disclosure.

A parser 510 may parse encoded image data to be decoded and information about encoding required for decoding from a bitstream 505. The encoded image data may be output as inverse quantized data through an entropy decoder 520 and an inverse quantizer 530, and the inverse quantized data may be reconstructed to image data of a space domain through an inverse transformer 540.

An intra predictor 550 may perform intra prediction on a coding unit of an intra mode with respect to the image data of the space domain, and a motion compensator 560 may perform motion compensation on a coding unit of an inter mode by using a reference frame 585.

The image data of the space domain, which passed through the intra predictor 550 and the motion compensator 560, may be output as a reconstruction frame 595 after being post-processed through a deblocking unit 570 and an offset adjuster 580. Also, the image data that is post-processed through the deblocking unit 570 and the offset adjuster 580 may be output as the reference frame 585.

In order to decode the image data in the image data decoder 230 of the video decoding apparatus 200, the step-by-step operations after the parser 510 of the image decoder 500 according to an embodiment may be performed.

In order for the image decoder 500 to be applied to the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the offset adjuster 580 may perform operations based on coding units having a tree structure for each largest coding unit.

In particular, the intra predictor 550 and the motion compensator 560 may determine partitions and a prediction mode for each of the coding units having a tree structure, and the inverse transformer 540 may determine a size of a transformation unit for each coding unit.

The image decoder 500 may extract offset use information for each of the largest coding units, offset merge information, and an offset parameter from a bitstream. A current offset parameter equal to an offset parameter of an adjacent largest coding unit may be reconstructed based on the offset merge information of a current largest coding unit. By using an offset type and offset values among the offset parameters of the current largest coding unit, it may be adjusted by the offset value corresponding to a category according to an edge type or a band type for each largest coding unit of the reconstruction frame 595.

Figure 16:
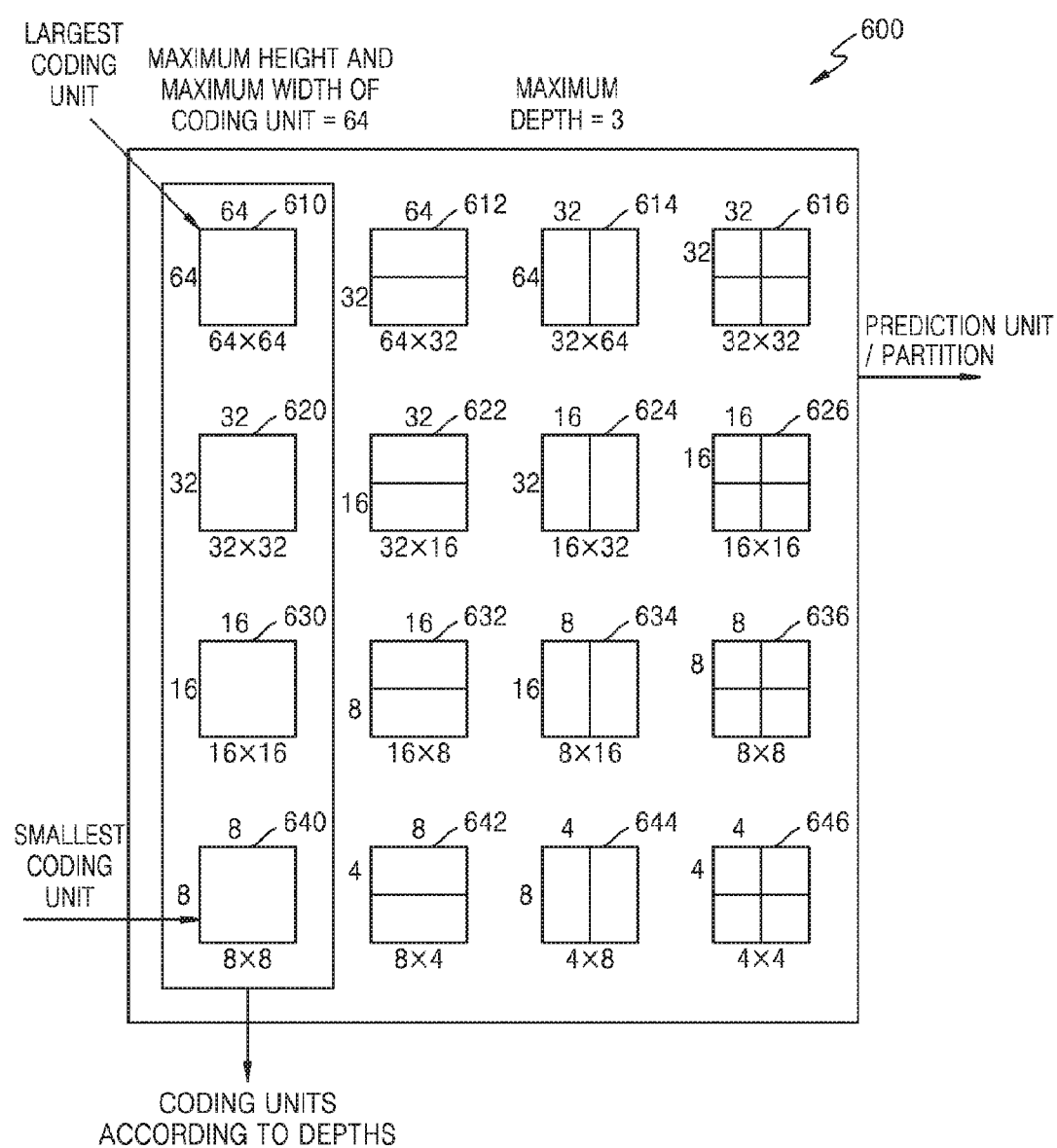
FIG. 16 illustrates deeper coding units according to depths, and partitions, according to an embodiment of the present disclosure.

FIG. 16 illustrates deeper coding units according to depths, and partitions, according to an embodiment of the present disclosure.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 4. In this case, the maximum depth refers to a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are present. The coding unit 640 having a size of 4×4 and a depth of 3 is a smallest coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions included in the coding unit 610 having a size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having a size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having a size of 16×16, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having a size of 8×8, i.e. a partition 640 having a size of 8×8 included in the coding unit 640, partitions 642 having a size of 8×4, partitions 644 having a size of 4×8, and partitions 646 having a size of 4×4.

In order to determine a coded depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a minimum encoding error that is a representative encoding error of a corresponding depth may be selected by performing encoding on each of prediction units of the coding units according to depths, along the horizontal axis of the hierarchical structure of coding units 600. Alternatively, the minimum encoding error may be searched for by comparing the minimum encoding errors according to depths, by performing encoding for each depth as the depth deepens along the vertical axis of the hierarchical structure 600. A depth and a partition generating the minimum encoding error in the largest coding unit 610 may be selected as a coded depth and a partition type of the largest coding unit 610.

Figure 17:
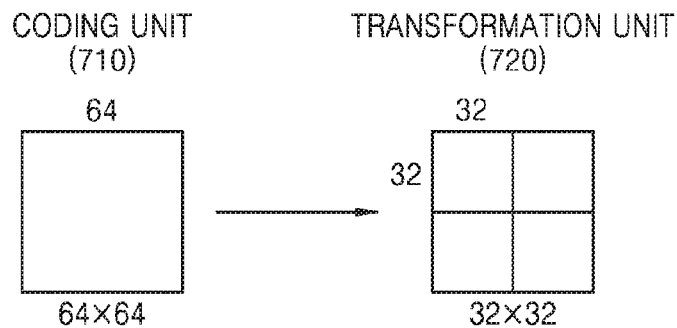
FIG. 17 illustrates a relationship between a coding unit and transformation units, according to an embodiment of the present disclosure.

FIG. 17 illustrates a relationship between a coding unit and transformation units, according to an embodiment of the present disclosure.

The video encoding apparatus 100 according to an embodiment or the video decoding apparatus 200 according to an embodiment encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 100 or the video decoding apparatus 200, when a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the minimum coding error may be selected.

Figure 18:
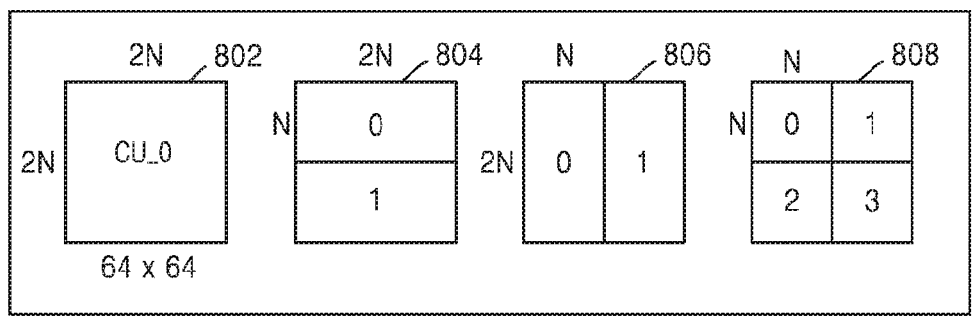
FIG. 18 illustrates a plurality of pieces of encoding information according to depths, according to an embodiment of the present disclosure.
Figure 18:
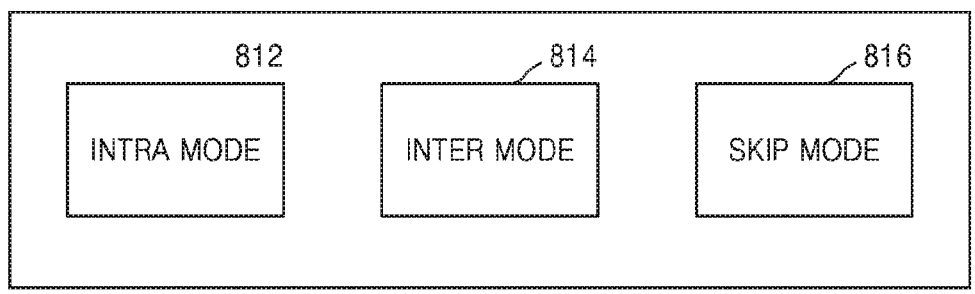
Figure 18:
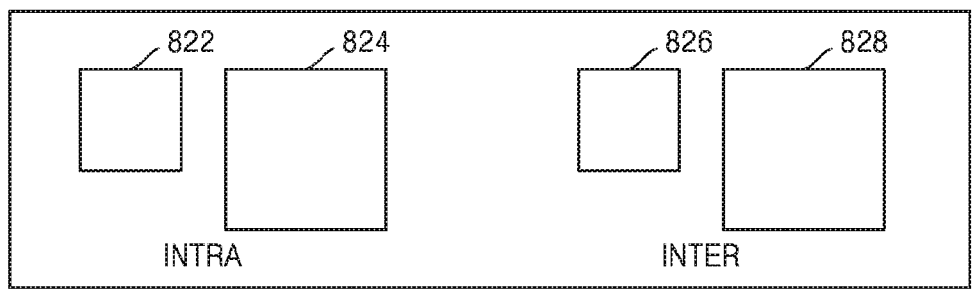

FIG. 18 illustrates a plurality of pieces of encoding information according to depths, according to an embodiment of the present disclosure.

An output unit 130 of the video encoding apparatus 100 may encode and transmit partition type information 800, prediction mode information 810, and transformation unit size information 820 for each coding unit corresponding to a coded depth, as the encoding mode information.

The partition type information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition type information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 represents a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the partition mode information 800, the prediction mode information 810, and the transformation unit size information 820 for each deeper coding unit.

Figure 19:
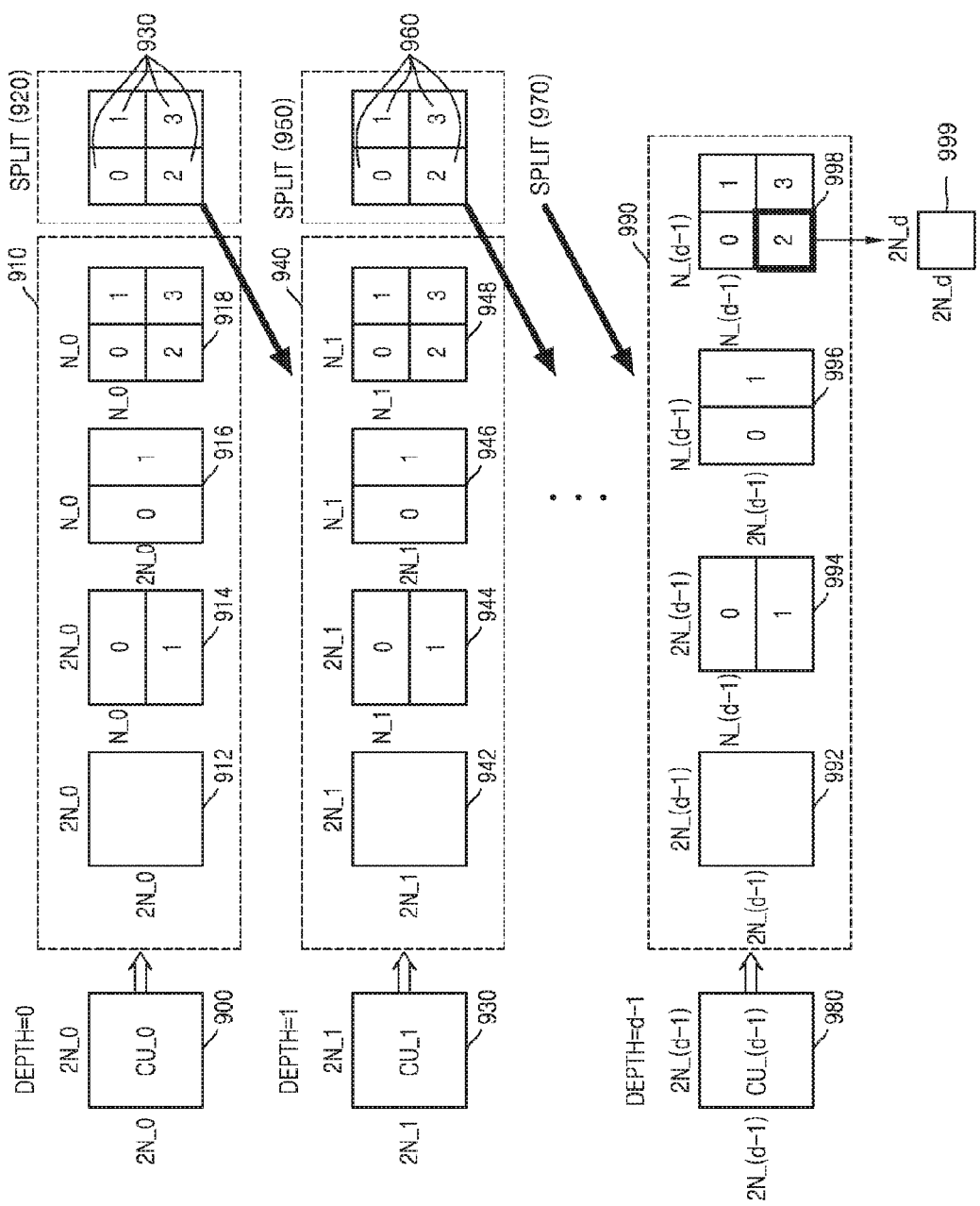
FIG. 19 illustrates deeper coding units according to depths, according to an embodiment of the present disclosure.

FIG. 19 illustrates deeper coding units according to depths, according to an embodiment of the present disclosure.

Split information may be used to indicate a change in a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. Only the partitions 912, 914, 916, and 918 which are obtained by symmetrically splitting the prediction unit are illustrated, but as described above, a partition type is not limited thereto and may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 912, 914, and 916 having the sizes of 2N_0×2N_0, 2N_0×N_0 and N_0×2N_0, the prediction unit 910 may not be split into a lower depth.

If the encoding error is the smallest in the partition type 918 having the size of N_0×N_0, a depth is changed from 0 to 1 and split is performed (operation 920), and encoding may be repeatedly performed on coding units 930 of a partition type having a depth of 2 and a size of N_0×N_0 so as to search for a minimum encoding error.

A prediction unit 940 for prediction encoding the coding unit 930 having a depth of 1 and a size of 2N_1×2N_1 (=N_0×N_0) may include a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types so as to search for a partition type generating a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a coded depth for the coding units constituting a current largest coding unit 900 is determined to be d−1 and a partition type of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to the embodiment may be a square data unit obtained by splitting a smallest coding unit having a lowermost coded depth by 4. By performing the encoding repeatedly, the video encoding apparatus 100 according to the embodiment may select a coded depth having the minimum encoding error by comparing encoding errors according to depths of the coding unit 900 to determine a depth, and set a corresponding partition type and a prediction mode as an encoding mode of the coded depth.

As such, the minimum encoding errors according to depths are compared in all of the depths of 0, 1, . . . , d−1, d, and a depth having a minimum encoding error may be determined as a coded depth. A coded depth, a partition type of a prediction unit, and a prediction mode may be encoded and transmitted as information about an encoding mode. Also, since a coding unit may be split from a depth of 0 to the coded depth, only split information of the coded depth may be set to '0' and split information according to depths excluding the coded depth may be set to '1'.

The image data and encoding information extractor 220 of the video decoding apparatus 200 according to the embodiment may extract and use a coded depth and prediction unit information about the coding unit 900 so as to decode the coding unit 912. The video decoding apparatus 200 according to the embodiment may determine a depth, in which split information is '0', as a coded depth by using split information according to depths, and may use, for decoding, encoding mode information about the corresponding depth.

Figure 20:
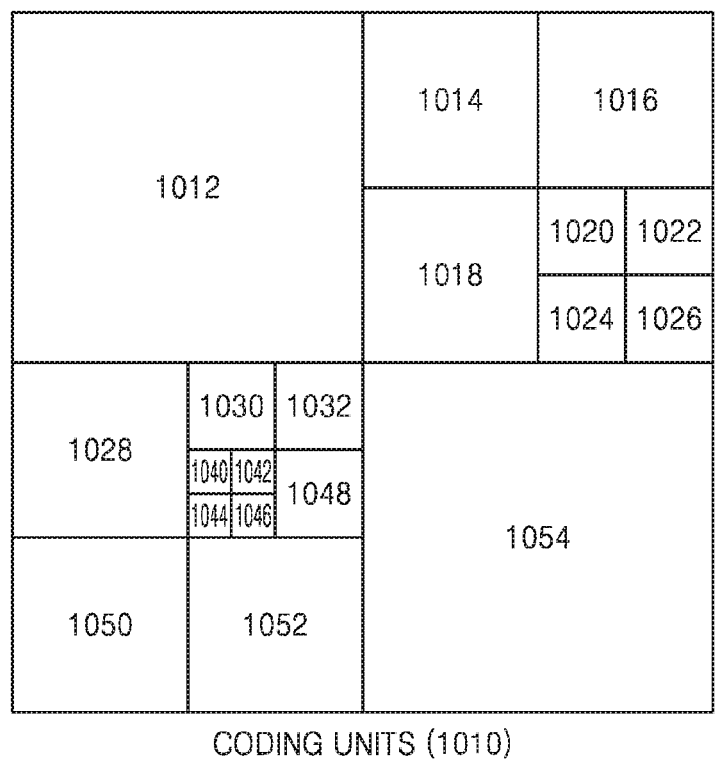
FIGS. 20, 21, and 22 illustrate a relationship between coding units, prediction units, and transformation units, according to an embodiment of the present disclosure.
Figure 21:
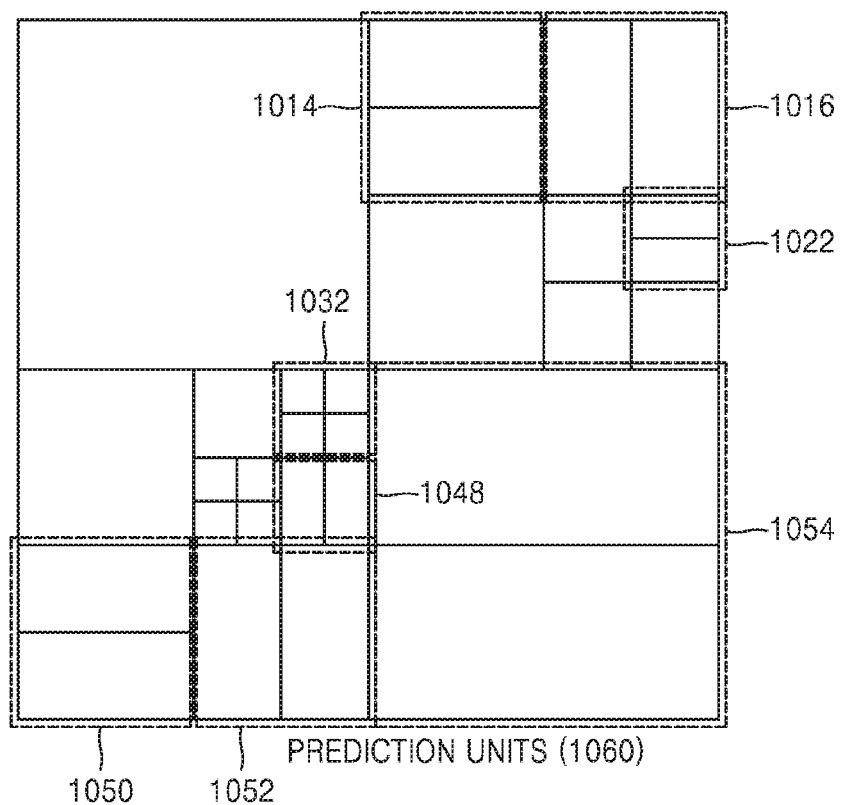
Figure 22:
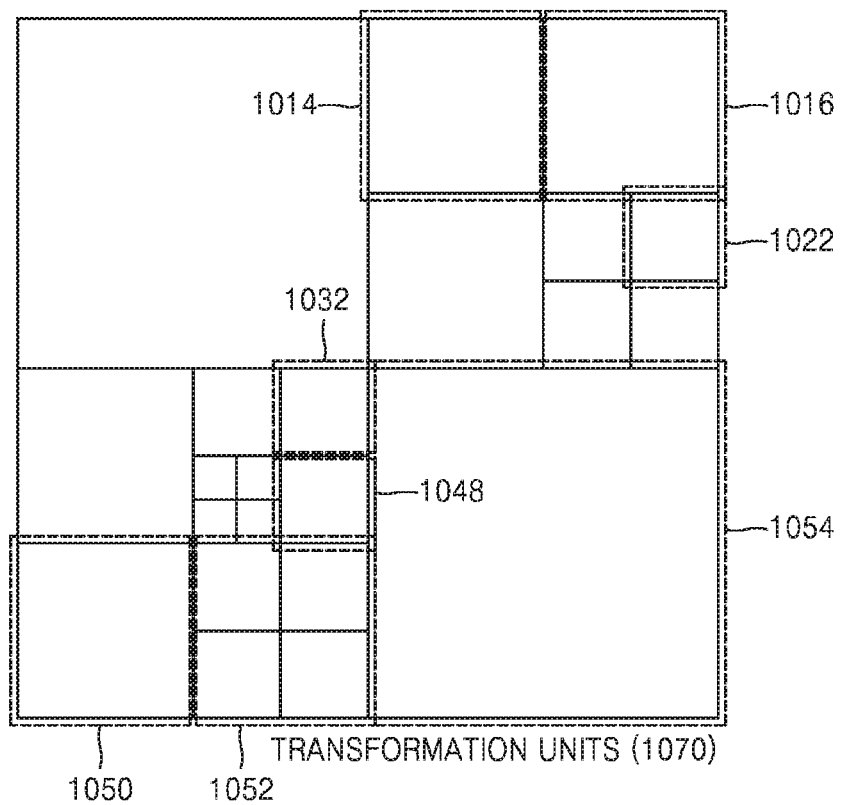

FIGS. 20, 21, and 22 illustrate a relationship between coding units, prediction units, and transformation units, according to an embodiment of the present disclosure.

Coding units 1010 are deeper coding units according to coded depths determined by the video encoding apparatus 100, in a largest coding unit. Prediction units 1060 are partitions of prediction units of each of the coding units 1010 according to coded depths, and transformation units 1070 are transformation units of each of the coding units according to coded depths.

When a depth of a largest coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. That is, partitions 1014, 1022, 1050, and 1054 are a partition type having a size of 2N×N, partitions 1016, 1048, and 1052 are a partition type having a size of N×2N, and a partition 1032 is a partition type having a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1760 are data units different from those in the Prediction units 1060 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, partition type information, prediction mode information, and transformation unit size information. Table 1 below shows the encoding information that may be set by the video encoding apparatus 100 and the video decoding apparatus 200 according to the embodiments.

unit is no longer split into a lower depth, is a coded depth, and thus partition type information, prediction mode information, and transformation unit size information may be defined for the coded depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The partition type information may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding

TABLE 1

Split Information 0
(Encoding on Coding Unit having Size of 2N × 2N and Current Depth of d)

| | | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information specifies whether a current coding unit is split into coding units of a lower depth. If split information of a current depth d is 0, a depth, in which a current coding unit is an asymmetrical partition type, the size of the transformation unit may be N/2×N/2.

The encoding information about coding units having a tree structure according to the embodiment may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the coding unit corresponding to the same coded depth by comparing a plurality of pieces of encoding information of the adjacent data units. Also, a corresponding coding unit corresponding to a coded depth is determined by using encoding information of a data unit, and thus a distribution of coded depths in a largest coding unit may be inferred.

Accordingly, if a current coding unit is predicted based on adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 23:
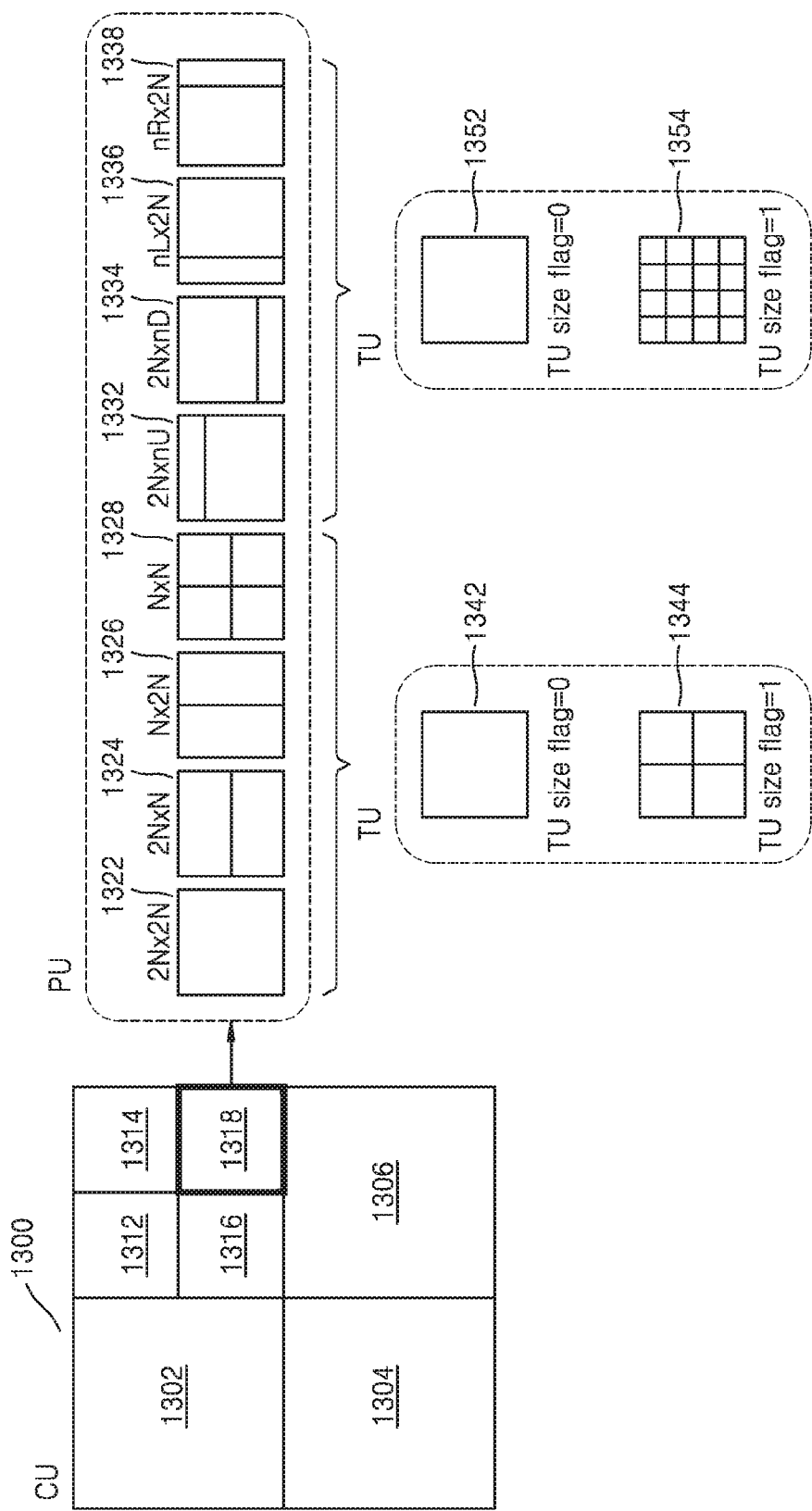
FIG. 23 illustrates a relationship between a coding unit, a prediction unit, and a transformation unit, according to encoding mode information of Table 1.

FIG. 23 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of coded depths. Here, since the coding unit 1318 is a coding unit of a coded depth, split information may be set to 0. Partition type information of the coding unit 1318 having a size of 2N×2N may be set to be one of partition types including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition type of the coding unit.

For example, when the partition type information is set to be one of symmetrical partition types 2N×2N 1322, 2N×N 1324, N×2N 1326, and N×N 1328, a transformation unit 1342 having a size of 2N×2N is set if a TU size flag of a transformation unit is 0, and a transformation unit 1344 having a size of N×N is set if a TU size flag is 1.

When the partition type information is set to be one of asymmetrical partition types 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 23 is a flag having a value or 0 or 1, but the transformation unit split information according to an embodiment is not limited to a flag having 1 bit, and the transformation unit may be hierarchically split while the transformation unit split information increases in a manner of 0, 1, 2, 3. etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 11 through 23, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

Also, an offset parameter may be signaled for each picture, for each slice, for each largest coding unit, for each coding unit according to a tree structure, for each prediction unit of a coding unit, or for each transformation unit of a coding unit. For example, the largest coding unit having a minimized error with respect to the original block may be reconstructed by adjusting the reconstruction sample values of the largest coding unit by using the offset value reconstructed based on the offset parameter received for each largest coding unit.

The above embodiments of the inventive concept may be written as computer programs and may be implemented in general-purpose digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

The present disclosure has been particularly shown and described with reference to embodiments thereof. However, it will be understood by one of ordinary skill in the art that various changes in form and details may be made therein without departing from the spirit and scope of the following claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

For convenience of description, the video encoding methods according to sample offset adjustment described above with reference to FIGS. 1A to 23 will be collectively referred to as "the video encoding method of the inventive concept". Also, the video decoding method according to sample offset adjustment described above with reference to FIGS. 1A to 23 will be referred to as "the video decoding method of the inventive concept".

Also, a video encoding apparatus including the video encoding apparatus 10, the video encoding apparatus 100, or the image encoder 400, which has been described with reference to FIGS. 1A through 23, will be referred to as a 'video encoding apparatus of the present disclosure'. Also, the video decoding apparatuses including the video decoding apparatus 20, the video decoding apparatus 200, or the image decoder 500 described above with reference to FIGS. 2A to 23 will be collectively referred to as 'the video decoding apparatus of the inventive concept'.

A non-transitory computer-readable recording medium such as a disc 26000 that stores the programs according to an embodiment will now be described in detail.

Figure 24:
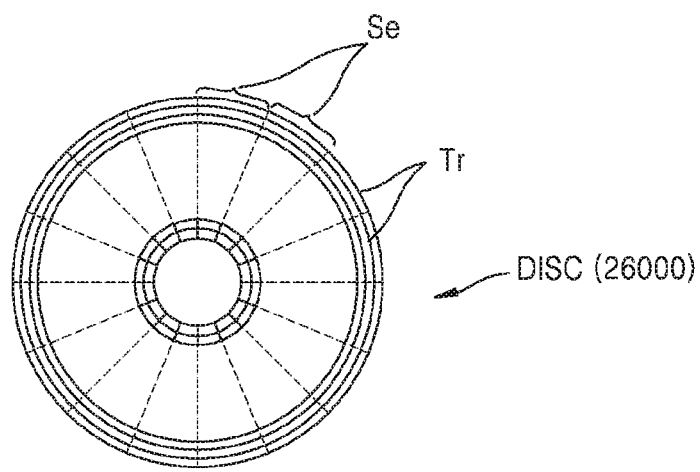
FIG. 24 is a diagram of a physical structure of a disc in which a program is stored, according to an embodiment.

FIG. 24 illustrates a physical structure of the disc 26000 in which a program is stored, according to an embodiment. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 26.

Figure 25:
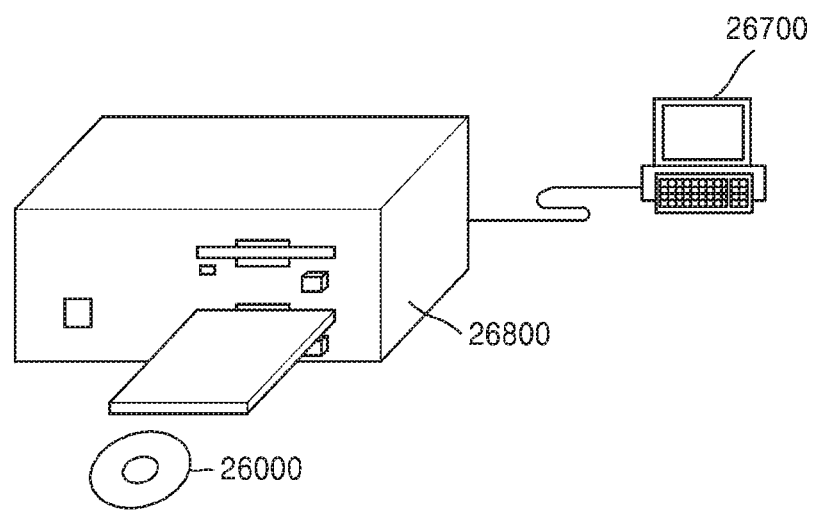
FIG. 25 is a diagram of a disc drive for recording and reading a program by using the disc.

FIG. 25 illustrates a disc drive 26800 for recording and reading a program by using the disc 26000. A computer system 27000 may store a program that executes at least one of a video encoding method and a video decoding method of the present disclosure, in the disc 26000 via the disc drive 26800. In order to run the program stored in the disc 26000 in the computer system 26700, the program may be read from the disc 26000 and be transmitted to the computer system 26700 by using the disc drive 26800.

The program that executes at least one of the video encoding method and the video decoding method of the present disclosure may be stored not only in the disc 26000 illustrated in FIGS. 24 and 25 but may also be stored in a memory card, a ROM cassette, or a solid state drive (SSD).

A system to which the video encoding method and the video decoding method described above are applied will be described below.

Figure 26:
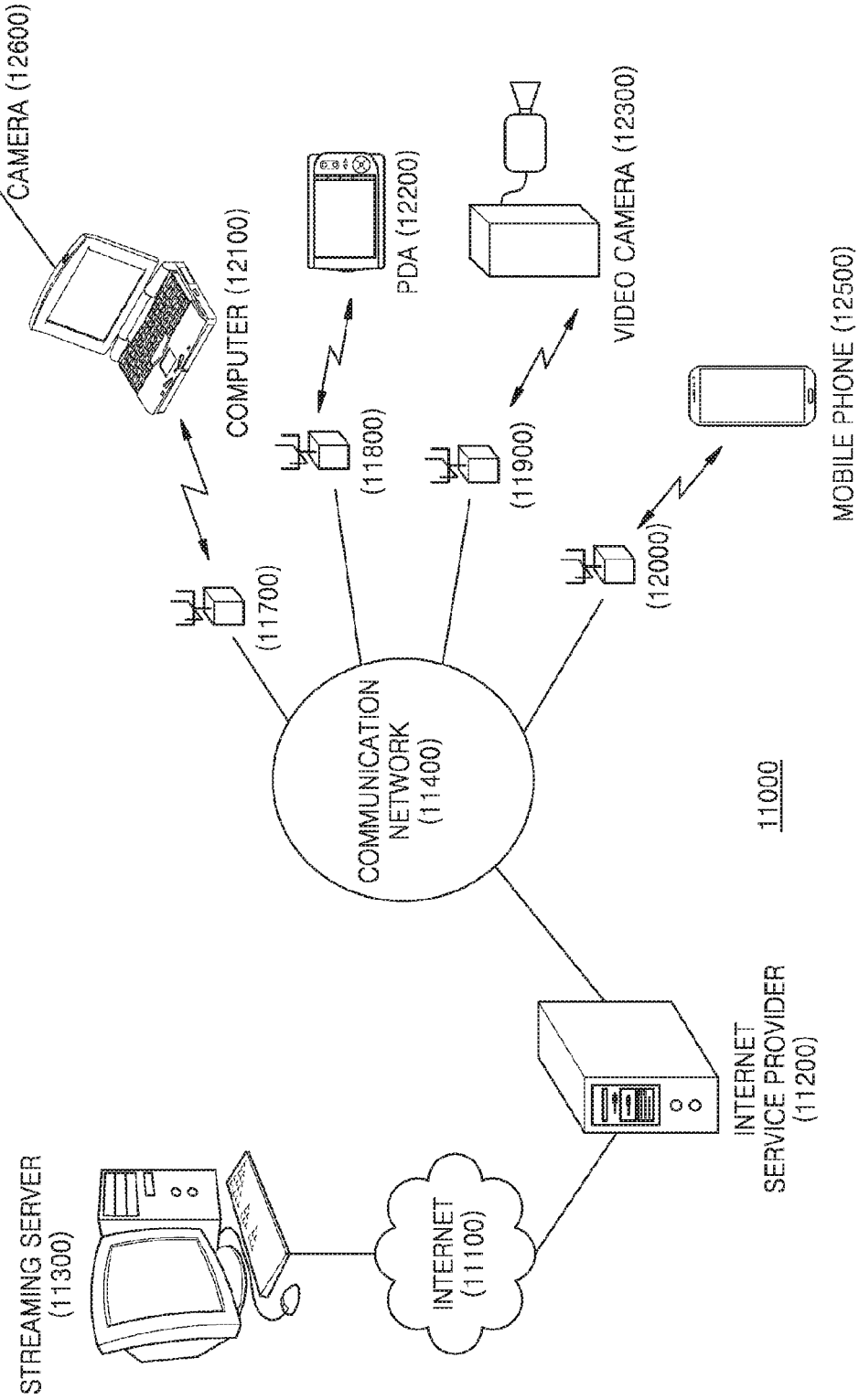
FIG. 26 is a diagram of an overall structure of a content supply system for providing a content distribution service.

FIG. 26 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 28:
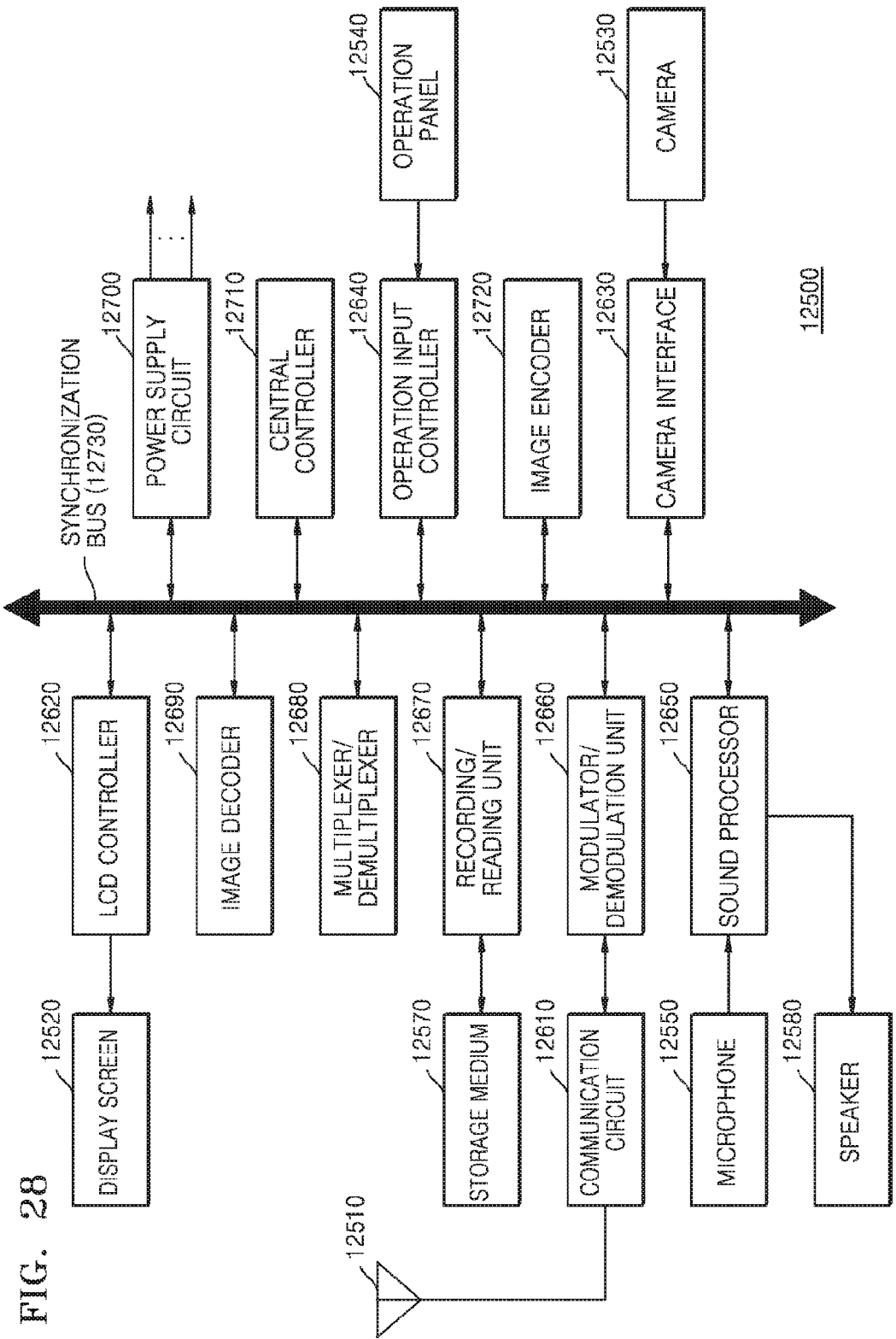

However, the content supply system 11000 is not limited to the structure as illustrated in FIG. 28, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 such as a digital camera is an imaging device capable of capturing both still images and video images. The video data captured by the camera 12600 may be encoded by using the camera 12600 or the computer 12100. Software that performs encoding and decoding video may be stored in a non-transitory computer-readable recording medium, e.g., a CD-ROM disc, a floppy disc, a hard disc drive, an SSD, or a memory card, which may be accessed by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

In the content supply system 11000 according to an embodiment, content data, e.g., content recorded during a concert, which has been recorded by a user using the video camera 12300, the camera 12600, the mobile phone 12500, or another imaging device is encoded and is transmitted to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to embodiments.

Figure 27:
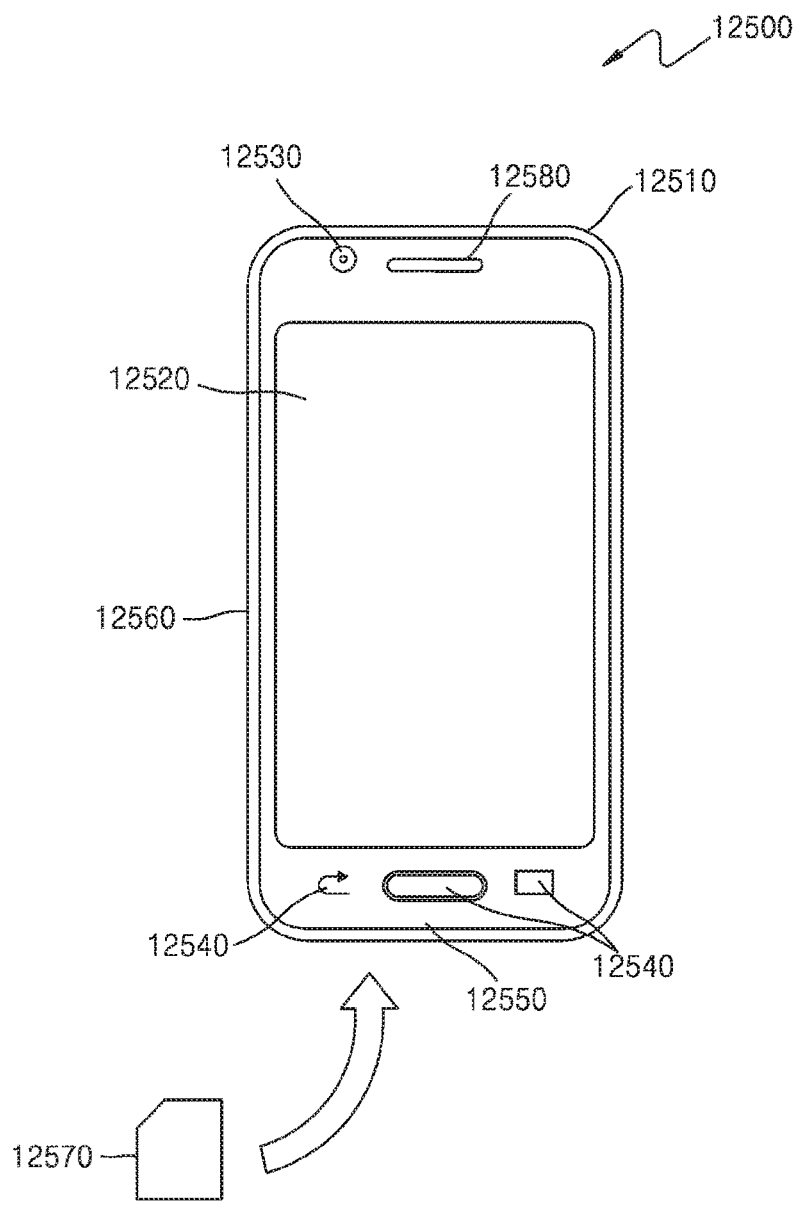
FIGS. 27 and 28 illustrate external and internal structures of a mobile phone to which a video encoding method and a video decoding method are applied, according to embodiments.

With reference to FIGS. 27 and 28, the mobile phone 12500 included in the content supply system 11000 according to an embodiment will now be described in detail.

FIG. 27 illustrates an external structure of the mobile phone 12500 to which the video encoding method and the video decoding method of the present disclosure are applied, according to an embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 28 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by the control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650 by the control of the central controller 12710. The generated digital sound signal may be converted to a transmission signal through the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By the control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The image data captured by using the camera 12530 may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 so as to convert the received signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is converted to an analog sound signal via the modulation/demodulation unit 12660 and the sound processor 12650, and the analog sound signal is output via the speaker 12580 by the control of the central controller 12710.

When, in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video datastream and an encoded audio datastream. Via the synchronization bus 12730, the encoded video datastream and the encoded audio datastream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method according to the embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus of the present disclosure, may be a transmitting terminal including only the video encoding apparatus, or may be a receiving terminal including only the video decoding apparatus.

Figure 29:
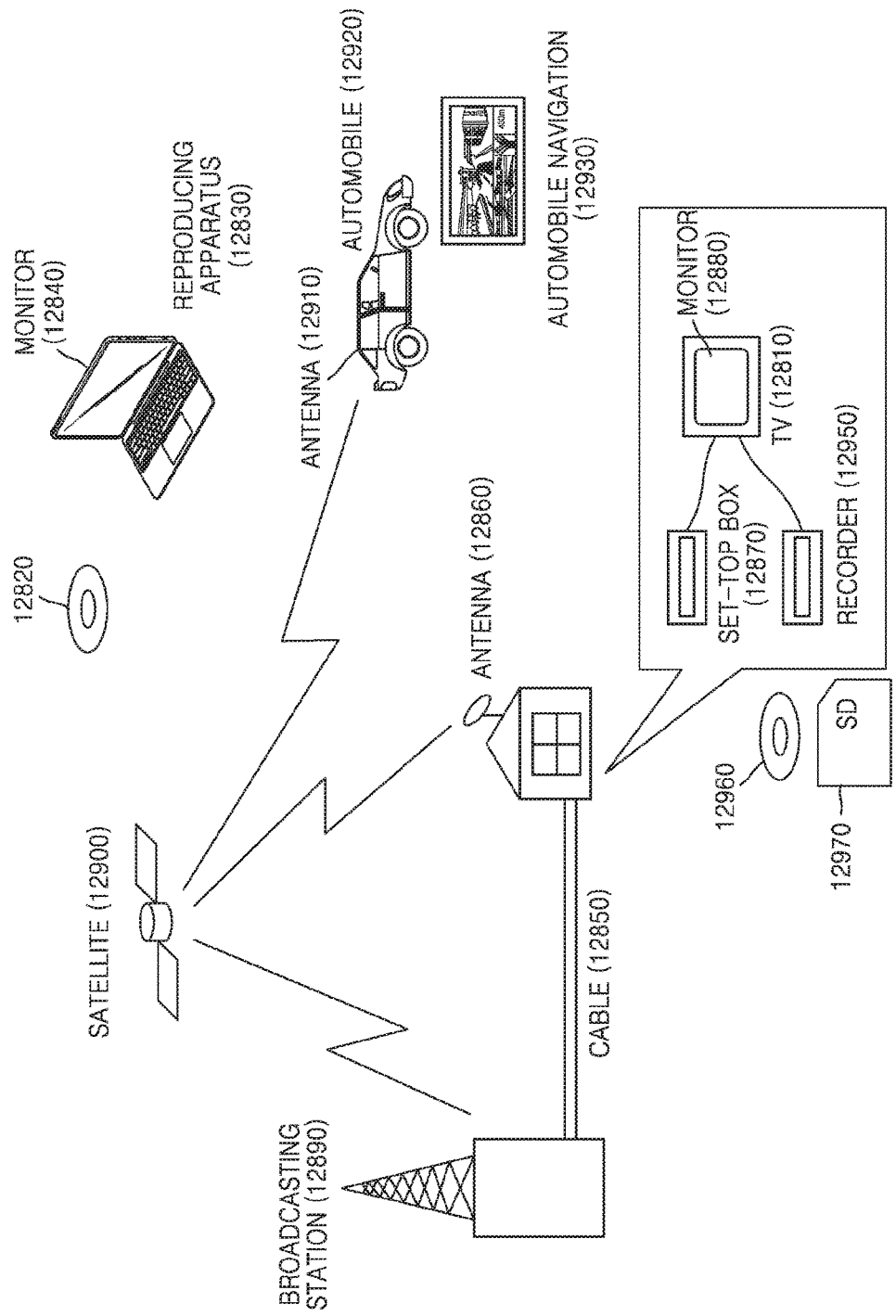
FIG. 29 illustrates a digital broadcasting system employing a communication system according to an embodiment.

A communication system according to the present disclosure is not limited to the communication system described above with reference to FIG. 27. For example, FIG. 29 illustrates a digital broadcasting system employing a communication system, according to an embodiment. The digital broadcasting system of FIG. 29 may receive a digital broadcast transmitted via a satellite or a terrestrial network by using the video encoding apparatus and the video decoding apparatus of the present disclosure.

In more detail, a broadcasting station 12890 transmits a video datastream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to the embodiment may be installed. Data output from the set-top box 12870 may also be reproduced on a TV monitor 12880.

As another example, the video decoding apparatus according to the embodiment may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus of the present disclosure and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the embodiment, a video signal recorded on the DVD disc 12960, the SD card 12970, or another storage medium may be reproduced on the TV monitor 12880.

Figure 30:
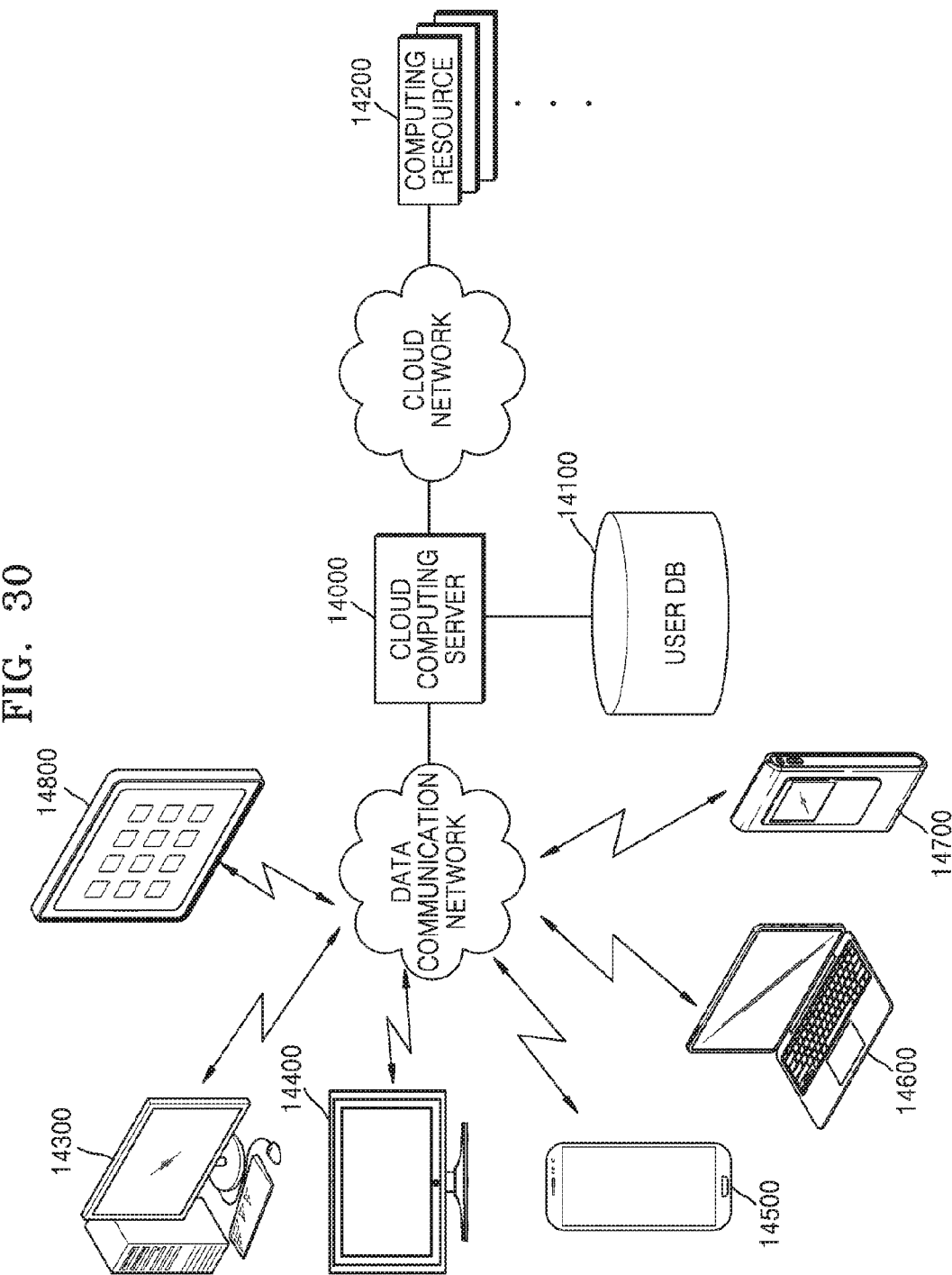
FIG. 30 is a diagram illustrating a network structure of a cloud computing system using a video encoding apparatus and a video decoding apparatus, according to an embodiment.

The automobile navigation system 12930 may not include the camera 12530, the camera interface 12630, and the image encoder 12720 of FIG. 30. For example, the computer 12100 and the TV receiver 12810 may not include the camera 12530, the camera interface 12630, and the image encoder 12720 of FIG. 30.

FIG. 30 is a diagram illustrating a network structure of a cloud computing system using a video encoding apparatus and a video decoding apparatus, according to an embodiment of the present disclosure.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 27.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus of the present disclosure as described above with reference to FIGS. 1A through 23. As another example, the user terminal may include the video encoding apparatus of the present disclosure as described above with reference to FIGS. 1A through 23. Alternatively, the user terminal may include both the video decoding apparatus and the video encoding apparatus as described above with reference to FIGS. 1A through 23.

Various applications of a video encoding method, a video decoding method, a video encoding apparatus, and a video decoding apparatus according to various embodiments described above with reference to FIGS. 1A through 23 have been described above with reference to FIGS. 24 through 30. However, various embodiments of methods of storing the video encoding method and the video decoding method in a storage medium or various embodiments of methods of implementing the video encoding apparatus and the video decoding apparatus in a device described above with reference to FIGS. 1A through 23 are not limited to the embodiments of FIGS. 24 through 30.

The present disclosure has been particularly shown and described with reference to embodiments thereof. However, it will be understood by one of ordinary skill in the art that various changes in form and details may be made therein without departing from the spirit and scope of the following claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. A video decoding method comprising:
   acquiring offset type information of a current block;
   determining a first neighboring sample and a second neighboring sample of a current reconstruction sample of the current block according to an edge direction when the offset type information of the current block indicates an edge type;
   determining an offset category of the current reconstruction sample based on a curvature of the sample value in the current reconstruction sample; and
   applying, from among offsets acquired from a bitstream, an offset according to the determined offset category to the current reconstruction sample,
   wherein the curvature of the sample value is determined based on the sample values of the current reconstruction sample, the first neighboring sample and the second neighboring sample.

2. A video decoding method comprising:
   acquiring offset type information of a current block;

determining a first neighboring sample and a second neighboring sample of a current reconstruction sample of the current block according to an edge direction when the offset type information of the current block indicates an edge type;

determining an offset category of the current reconstruction sample based on a radius of a circle passing through three points respectively according to a sample value of the current reconstruction sample, a sample value of the first neighboring sample, and a sample value of the second neighboring sample on a coordinate plane; and applying, from among offsets acquired from a bitstream, an offset according to the determined offset category to the current reconstruction sample.

3. A video decoding method comprising:

acquiring offset type information of a current block;

determining a first neighboring sample and a second neighboring sample of a current reconstruction sample of the current block according to an edge direction when the offset type information of the current block indicates an edge type;

determining a first sample value gradient between a sample value of the current reconstruction sample and a sample value of the first neighboring sample and a second sample value gradient between a sample value of the current reconstruction sample and a sample value of the second neighboring sample;

determining an offset category of the current reconstruction sample based on an angle between the first sample value gradient and the second sample value gradient; and applying, from among offsets acquired from a bitstream, an offset according to the determined offset category to the current reconstruction sample.

4. A video decoding method comprising:

acquiring offset type information of a current block;

determining a first neighboring sample and a second neighboring sample of a current reconstruction sample of the current block according to an edge direction when the offset type information of the current block indicates an edge type;

determining a first sample value gradient between a sample value of the current reconstruction sample and a sample value of the first neighboring sample and a second sample value gradient between a sample value of the current reconstruction sample and a sample value of the second neighboring sample;

determining an offset category of the current reconstruction sample by comparing a difference between the first sample value gradient and the second sample value gradient with a reference value; and applying, from among offsets acquired from a bitstream, an offset according to the determined offset category to the current reconstruction sample, wherein the reference value is determined based on a slice type of a slice including the current reconstruction sample.

5. The video decoding method of claim 1, wherein the determining of the offset category of the current reconstruction sample comprises determining the offset category of the current reconstruction sample as any one category among full valley, half valley, plain, half peak, and full peak.

6. The video decoding method of claim 1, wherein the determining of the offset category of the current reconstruction sample comprises determining the offset category of the current reconstruction sample in consideration of a maximum value and a minimum value of a sample value gradient in the current reconstruction sample.

7. A video encoding method comprising:

determining a first neighboring sample and a second neighboring sample of a current reconstruction sample of a current block according to an edge direction of the current reconstruction sample of the current block;

determining an offset category of the current reconstruction sample based on a curvature of the sample value in the current reconstruction sample;

determining an offset according to the determined offset category of the current reconstruction sample; and encoding the offset determined according to the determined offset category of the current reconstruction sample, wherein the curvature of the sample value is determined based on the sample values of the current reconstruction sample, the first neighboring sample and the second neighboring sample.

8. A video encoding method comprising:

determining a first neighboring sample and a second neighboring sample of a current reconstruction sample of a current block according to an edge direction of the current reconstruction sample of the current block;

determining an offset category of the current reconstruction sample based on a radius of a circle passing through three points respectively according to a sample value of the current reconstruction sample, a sample value of the first neighboring sample, and a sample value of the second neighboring sample on a coordinate plane;

determining an offset according to the determined offset category of the current reconstruction sample; and encoding the offset determined according to the determined offset category of the current reconstruction sample.

9. A video encoding method comprising:

determining a first neighboring sample and a second neighboring sample of a current reconstruction sample of a current block according to an edge direction of the current reconstruction sample of the current block;

determining a first sample value gradient between a sample value of the current reconstruction sample and a sample value of the first neighboring sample and a second sample value gradient between a sample value of the current reconstruction sample and a sample value of the second neighboring sample;

determining an offset category of the current reconstruction sample based on an angle between the first sample value gradient and the second sample value gradient;

determining an offset according to the determined offset category of the current reconstruction sample; and encoding the offset determined according to the determined offset category of the current reconstruction sample.

10. A video encoding method comprising:

determining a first neighboring sample and a second neighboring sample of a current reconstruction sample of a current block according to an edge direction of the current reconstruction sample of the current block;

determining a first sample value gradient between a sample value of the current reconstruction sample and a sample value of the first neighboring sample and a second sample value gradient between a sample value of the current reconstruction sample and a sample value of the second neighboring sample;

determining an offset category of the current reconstruction sample by comparing a difference between the first sample value gradient and the second sample value gradient with a reference value;

determining an offset according to the determined offset category of the current reconstruction sample; and encoding the offset determined according to the determined offset category of the current reconstruction sample, wherein the reference value is determined based on a slice type of a slice including the current reconstruction sample.

11. The video encoding method of claim 7, wherein the determining of the offset category of the current reconstruction sample comprises determining the offset category of the current reconstruction sample as any one category among full valley, half valley, plain, half peak, and full peak.

12. A video decoding apparatus comprising:

an offset parameter acquirer configured to acquire offset type information of a current block, acquire edge class information representing an edge direction when the offset type information of the current block indicates an edge type, and determine a first neighboring sample and a second neighboring sample of a current reconstruction sample of the current block according to the edge direction; and a sample compensator configured to determine an offset category of the current reconstruction sample based on a curvature of the sample value in the current reconstruction sample and apply, from among offsets acquired from a bitstream, an offset according to the determined offset category to the current reconstruction sample, wherein the curvature of the sample value is determined based on the sample values of the current reconstruction sample, the first neighboring sample and the second neighboring sample.

* * * * *